US011902238B2

(12) United States Patent
Rhazi et al.

(10) Patent No.: US 11,902,238 B2
(45) Date of Patent: Feb. 13, 2024

(54) SYSTEMS AND METHODS FOR SHARING CHANNELS IN A GROUP-BASED COMMUNICATION PLATFORM

(71) Applicant: Slack Technologies, LLC, San Francisco, CA (US)

(72) Inventors: Sufian Rhazi, Brooklyn, NY (US); Pedro Carmo, San Francisco, CA (US); Rachel Lum, Long Island City, NY (US); Wei Tai Ting, New York, NY (US); Whitney Levine, New York, NY (US)

(73) Assignee: Slack Technologies, LLC, San Francisco, CA (US)

( * ) Notice: Subject to any disclaimer, the term of this patent is extended or adjusted under 35 U.S.C. 154(b) by 0 days.

(21) Appl. No.: 18/153,240

(22) Filed: Jan. 11, 2023

(65) Prior Publication Data

US 2023/0224270 A1    Jul. 13, 2023

Related U.S. Application Data

(63) Continuation of application No. 17/239,450, filed on Apr. 23, 2021, now Pat. No. 11,588,779.

(51) Int. Cl.
*G06F 3/0482* (2013.01)
*H04L 51/52* (2022.01)
*G06F 3/0484* (2022.01)

(52) U.S. Cl.
CPC ............ *H04L 51/52* (2022.05); *G06F 3/0482* (2013.01); *G06F 3/0484* (2013.01)

(58) Field of Classification Search
CPC ............................................... G06F 3/048–05
See application file for complete search history.

(56) References Cited

U.S. PATENT DOCUMENTS

| 7,512,655 B2 * | 3/2009 | Armstrong | H04L 51/04 |
| | | | 709/205 |
| 8,924,335 B1 * | 12/2014 | Trefler | H04L 67/303 |
| | | | 706/47 |

(Continued)

OTHER PUBLICATIONS

Justin Duino, "How to Create New Sections to Group Channels in Slack", available on Apr. 7, 2020, available at <<https://www.howtogeek.com/666915/how-to-create-new-sections-to-group-channels-in-slack/>>, 10 pages (Year: 2020).*

*Primary Examiner* — Daniel Rodriguez
(74) *Attorney, Agent, or Firm* — Holland & Hart LLP

(57) ABSTRACT

A method includes displaying a plurality of group-based communication channels in an interface associated with a first user of a group-communication platform; receiving a request from the first user to share a selected set of the group-based communication channels with at least a second user of the group-based communication platform; displaying to at least the second user an indication of at least one group-based communication channel of the selected set of group-based communication channels and an affordance to add the at least one group-based communication channel of the selected set of group-based communication channels; in response to receiving an actuation of the affordance by the second user, adding the at least one group-based communication channel to an interface associated with the second user; and updating display of the interface associated with the second user to include the at least one group-based communication channel.

20 Claims, 14 Drawing Sheets

(56) References Cited

U.S. PATENT DOCUMENTS

| | | | |
|---|---|---|---|
| 8,924,999 B1* | 12/2014 | Santangelo | H04N 21/2668 725/9 |
| 8,990,352 B1* | 3/2015 | Kosslyn | G06F 16/487 709/219 |
| 10,331,303 B1* | 6/2019 | Gurtin | G06F 3/0482 |
| 10,621,272 B1* | 4/2020 | Rose | H04L 51/23 |
| 2005/0250494 A1* | 11/2005 | Lee | H04L 61/50 455/433 |
| 2006/0073812 A1* | 4/2006 | Punaganti Venkata | H04L 67/55 455/412.1 |
| 2008/0091761 A1* | 4/2008 | Tsao | H04L 51/04 709/201 |
| 2009/0164654 A1* | 6/2009 | Krstulich | H04L 67/34 709/231 |
| 2009/0183108 A1* | 7/2009 | Arrouye | G06F 16/10 715/810 |
| 2012/0092346 A1* | 4/2012 | Ording | G06F 3/04842 345/473 |
| 2012/0240062 A1* | 9/2012 | Passmore | H04L 51/52 715/758 |
| 2013/0205219 A1* | 8/2013 | Moha | H04L 67/00 715/748 |
| 2014/0040764 A1* | 2/2014 | Stoop | G06F 3/04842 715/748 |
| 2014/0068401 A1* | 3/2014 | Kirigin | G06F 16/9535 715/205 |
| 2016/0065672 A1* | 3/2016 | Savage | H04L 67/1095 709/219 |
| 2017/0359346 A1* | 12/2017 | Parab | H04L 67/02 |
| 2018/0278563 A1* | 9/2018 | Frost | H04L 51/52 |
| 2019/0028287 A1* | 1/2019 | Jin | G06F 16/13 |
| 2019/0238489 A1* | 8/2019 | Cohen | H04L 51/216 |
| 2020/0026783 A1* | 1/2020 | Watanabe | G06F 16/176 |
| 2021/0076099 A1* | 3/2021 | Ganschow | H04N 21/44 |
| 2021/0279305 A1* | 9/2021 | Goldston | G06F 16/61 |
| 2022/0086238 A1* | 3/2022 | Oh | H04L 51/56 |

\* cited by examiner

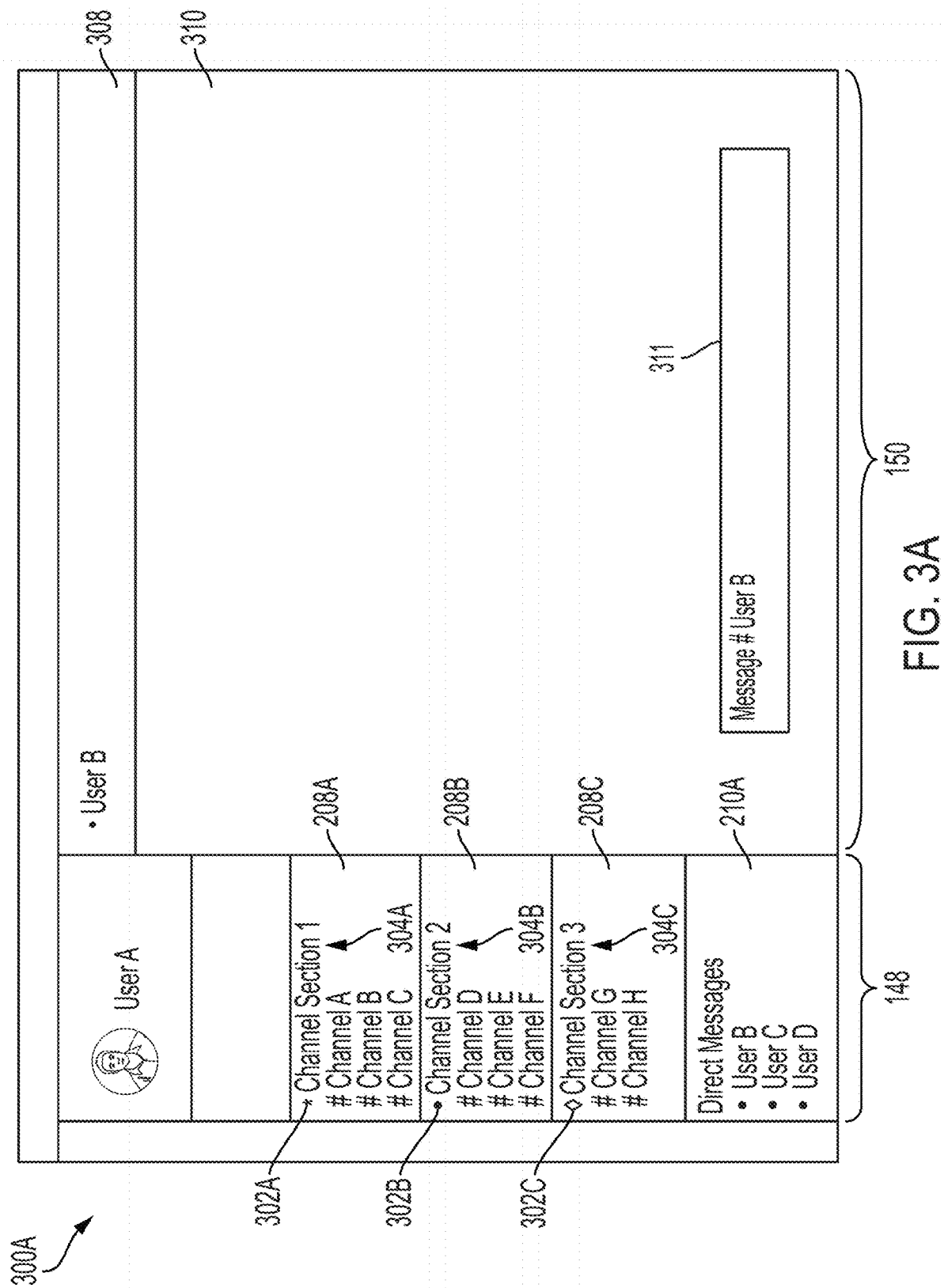

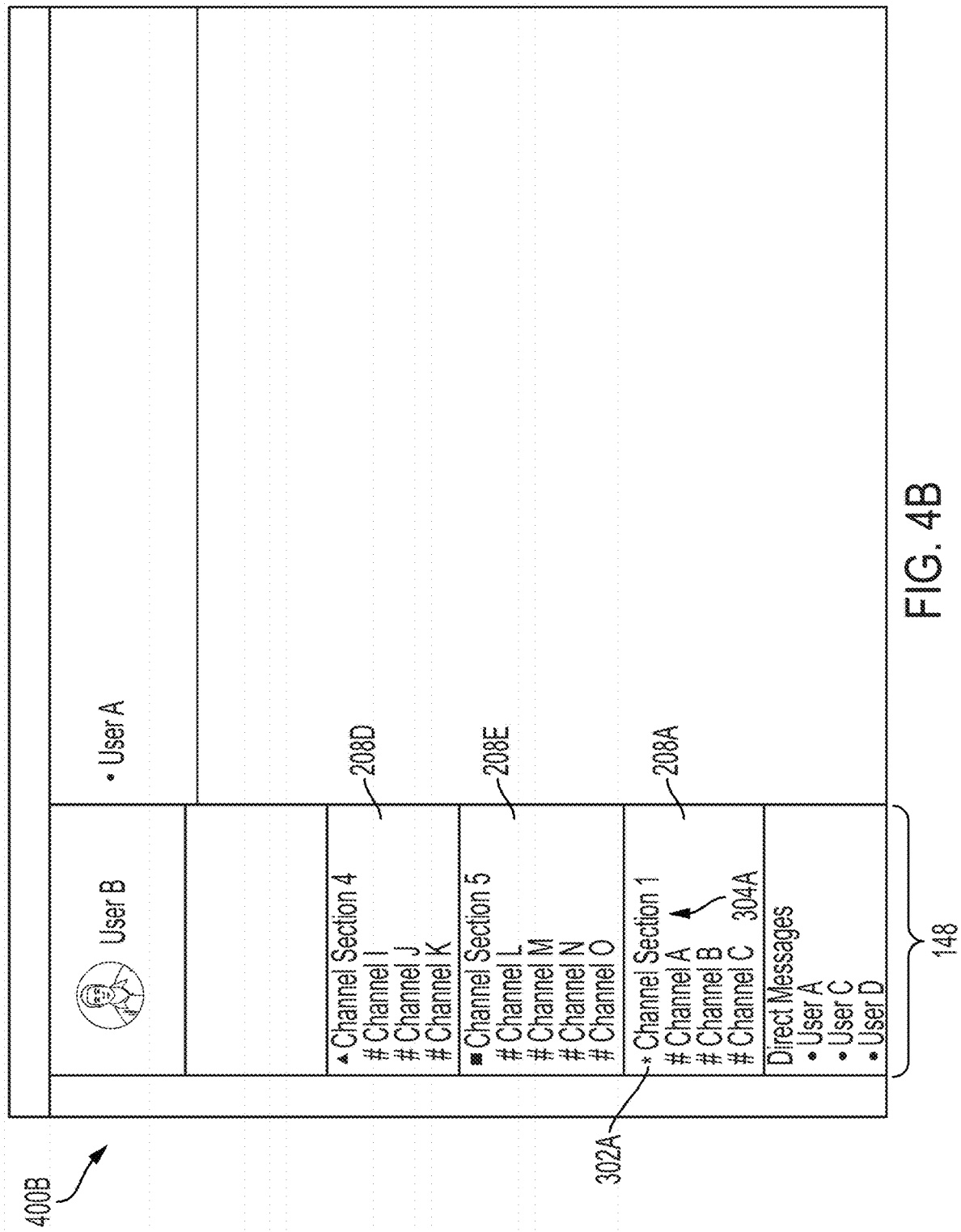

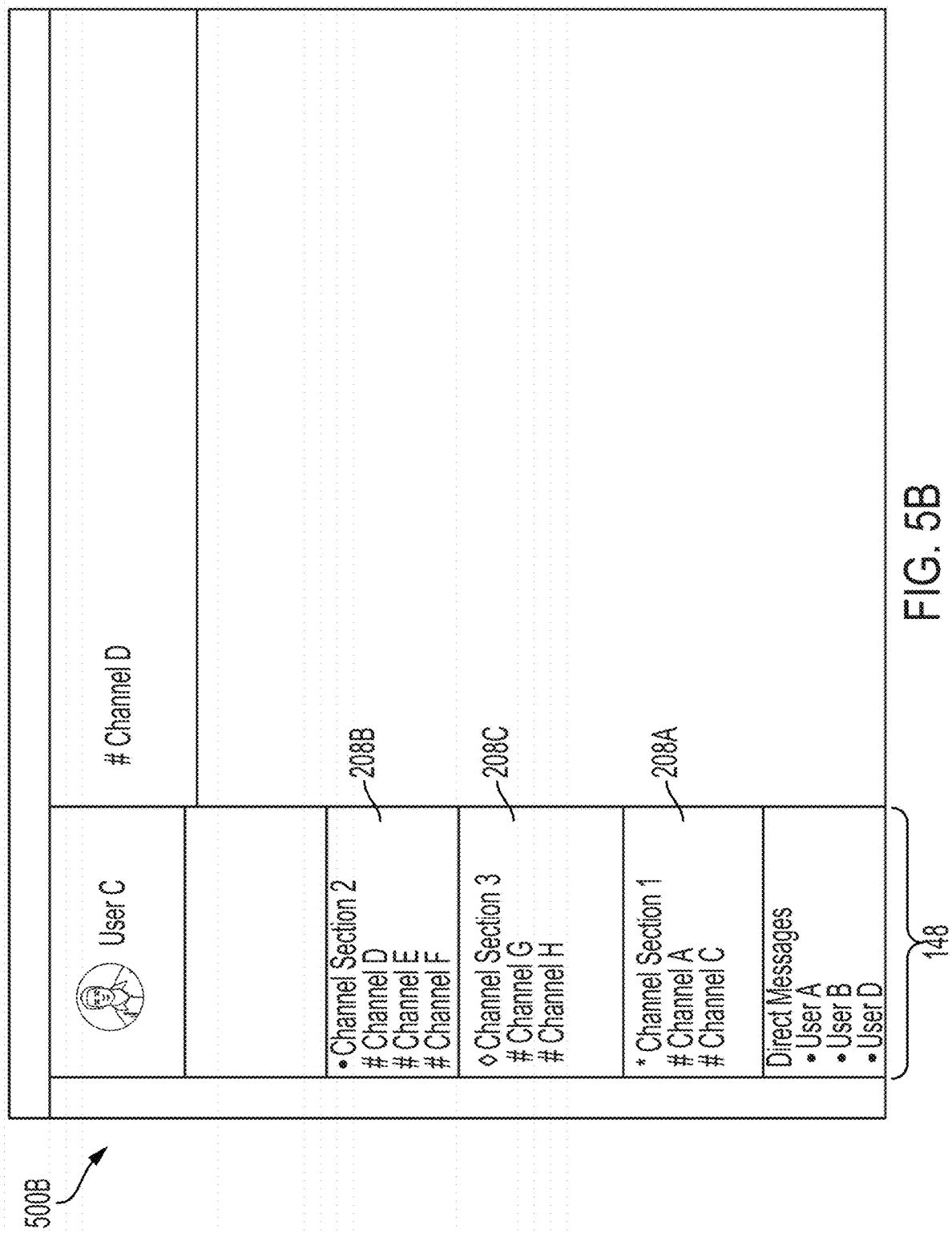

SYSTEMS AND METHODS FOR SHARING CHANNELS IN A GROUP-BASED COMMUNICATION PLATFORM

CROSS REFERENCE

The present Application for Patent is a continuation of U.S. patent application Ser. No. 17/239,450 by RHAZI et al., entitled "SYSTEMS AND METHODS FOR SHARING CHANNELS IN A GROUP-BASED COMMUNICATION PLATFORM," filed Apr. 23, 2021, assigned to the assignee hereof, and expressly incorporated by reference herein.

FIELD OF THE DISCLOSURE

The present disclosure relates generally to computer user interfaces, and more specifically to systems and methods for sharing communication channels in a group-based communication platform.

BACKGROUND

Communication platforms facilitate sharing of content between users. Some communication platforms enable users to join message groups in which messages posted to a particular message group are accessible to all of the users of that group. Message groups may be organized around particular topics or common characteristics of users. Some communication platforms may enable users to search for message groups to join. Alternatively or additionally, users may learn of useful or relevant message groups to join through word of mouth, such as from users that have been on the platform longer. Often, a user may be unaware of message groups that may be particularly relevant or useful to the user, particularly when the user is new on the platform.

SUMMARY

According to various embodiments, a group-based communication platform enables users to quickly and easily share group-based communication channels with other users of the group-based communication platform. Thus, for example, a first user that has joined a number of group-based communication channels that the first user believes may be relevant to a second user can easily share the communication channels with the second user without requiring the second user to hunt for the channels herself. According to various embodiments, the first user may select a set of group-based communication channels displayed in a group-based communication channel interface associated with the first user and generate a request to share the selected set of channels with a second user. An offer is provided to the second user to add at least some of the channels to a user interface associated with the second user. In response to acceptance of the offer by the second user, the channels are added to the second user's user interface. In some embodiments, channels may be organized in one or more sections in the user interface of the first user and the first user may share a plurality of channels by sharing one or more sections. In some embodiments, the channels shared via first user's selection of one or more sections may be added to the user interface of the second user organized into the same sections. Thus, the second user can quickly and easily be provided with at least some of the same channels provided to the first user.

In some embodiments, a computer-implemented method includes: displaying a plurality of group-based communication channels in a group-based communication platform interface associated with a first user of a group-based communication platform; receiving a request from the first user to share a selected set of the group-based communication channels with at least a second user of the group-based communication platform; displaying to at least the second user an indication of at least one group-based communication channel of the selected set of group-based communication channels and an affordance to add the at least one group-based communication channel of the selected set of group-based communication channels; in response to receiving an actuation of the affordance by the second user, adding the at least one group-based communication channel to a group-based communication platform interface associated with the second user; and updating display of the group-based communication platform interface associated with the second user to include the at least one group-based communication channel.

In any of these embodiments of the method, the plurality of group-based communication channels may be grouped into a plurality of sections in the group-based communication platform interface associated with the first user and the selected set of the group-based communication channels may be associated with a selected section of the plurality of sections.

In any of these embodiments of the method, adding the at least one group-based communication channel of the selected set of group-based communication channels to a group-based communication platform interface associated with the second user may comprise adding the selected section, and updating display of the group-based communication platform interface associated with the second user may comprise including the selected section in association with the added at least one group-based communication channel.

In any of these embodiments of the method, the second user can deselect one or more of the selected set of group-based communication channels before the at least one group-based communication channel is added to the group-based communication platform interface associated with the second user.

In any of these embodiments of the method, the request from the first user to share a selected set of the group-based communication channels with at least a second user of the group-based communication platform may comprise a request to share the selected set of the group-based communication channels with a group of members of a group-based communication channel.

In any of these embodiments of the method, the indication of the at least one group-based communication channel of the selected set of group-based communication channels and the affordance may be provided in the group-based communication channel associated with the group of members.

In any of these embodiments of the method, only channels of the selected set of group-based communication channels that the second user has permission to access may be added to the group-based communication platform interface associated with the second user.

In some embodiments, a computing system including one or more processors, memory, and one or more programs stored in the memory for execution by the one or more processors is provided, the one or more programs including instructions for: displaying a plurality of group-based communication channels in a group-based communication platform interface associated with a first user of a group-based communication platform; receiving a request from the first user to share a selected set of the group-based communication channels with at least a second user of the group-based communication platform; displaying to at least the second user an indication of at least one group-based communication channel of the selected set of group-based communication channels and an affordance to add the at least one group-based communication channel of the selected set of group-based communication channels; in response to receiving an actuation of the affordance by the second user, adding the at least one group-based communication channel to a group-based communication platform interface associated with the second user; and updating display of the group-based communication platform interface associated with the second user to include the at least one group-based communication channel.

In any of these embodiments of the system, the plurality of group-based communication channels may be grouped into a plurality of sections in the group-based communication platform interface associated with the first user and the selected set of the group-based communication channels may be associated with a selected section of the plurality of sections.

In any of these embodiments of the system, adding the at least one group-based communication channel of the selected set of group-based communication channels to a group-based communication platform interface associated with the second user may comprise adding the selected section; and updating display of the group-based communication platform interface associated with the second user may comprise including the selected section in association with the added at least one group-based communication channel.

In any of these embodiments of the system, the second user can deselect one or more of the selected set of group-based communication channels before the at least one group-based communication channel is added to the group-based communication platform interface associated with the second user.

In any of these embodiments of the system, the request from the first user to share a selected set of the group-based communication channels with at least a second user of the group-based communication platform may comprise a request to share the selected set of the group-based communication channels with a group of members of a group-based communication channel.

In any of these embodiments of the system, the indication of the at least one group-based communication channel of the selected set of group-based communication channels and the affordance may be provided in the group-based communication channel associated with the group of members.

In any of these embodiments of the system, only channels of the selected set of group-based communication channels that the second user has permission to access may be added to the group-based communication platform interface associated with the second user.

In some embodiments, a non-transitory computer readable medium storing one or more programs is provided, the one or more programs including instructions that, when executed by a processor, cause the processor to: display a plurality of group-based communication channels in a group-based communication platform interface associated with a first user of a group-based communication platform; receive a request from the first user to share a selected set of the group-based communication channels with at least a second user of the group-based communication platform; display to at least the second user an indication of at least one group-based communication channel of the selected set of group-based communication channels and an affordance to add the at least one group-based communication channel of the selected set of group-based communication channels; in response to receiving an actuation of the affordance by the second user, add the at least one group-based communication channel to a group-based communication platform interface associated with the second user; and update display of the group-based communication platform interface associated with the second user to include the at least one group-based communication channel.

In any of these embodiments of the non-transitory computer readable medium, the plurality of group-based communication channels may be grouped into a plurality of sections in the group-based communication platform interface associated with the first user and the selected set of the group-based communication channels may be associated with a selected section of the plurality of sections.

In any of these embodiments of the non-transitory computer-readable medium, adding the at least one group-based communication channel of the selected set of group-based communication channels to a group-based communication platform interface associated with the second user may comprise adding the selected section, and updating display of the group-based communication platform interface associated with the second user may comprise including the selected section in association with the added at least one group-based communication channel.

In any of these embodiments of the non-transitory computer-readable medium, the second user can deselect one or more of the selected set of group-based communication channels before the at least one group-based communication channel is added to the group-based communication platform interface associated with the second user.

In any of these embodiments of the non-transitory computer-readable medium, the request from the first user to share a selected set of the group-based communication channels with at least a second user of the group-based communication platform may comprise a request to share the selected set of the group-based communication channels with a group of members of a group-based communication channel.

In any of these embodiments of the non-transitory computer-readable medium, the indication of the at least one group-based communication channel of the selected set of group-based communication channels and the affordance may be provided in the group-based communication channel associated with the group of members.

BRIEF DESCRIPTION OF THE DRAWINGS

The invention will now be described, by way of example only, with reference to the accompanying drawings, in which:

FIGS. 3A-G illustrate aspects of an exemplary user interface associated with a first user of a group-based communication platform for sharing communication channels, according to some embodiments;

FIGS. 4A-4B illustrate aspects of exemplary user interface associated with a second user of a group-based communication platform for sharing communication channels, according to some embodiments;

FIGS. 5A-B illustrate aspects of exemplary user interface associated with a third user of a group-based communication platform for sharing communication channels, according to some embodiments.

DETAILED DESCRIPTION

Figure 1:
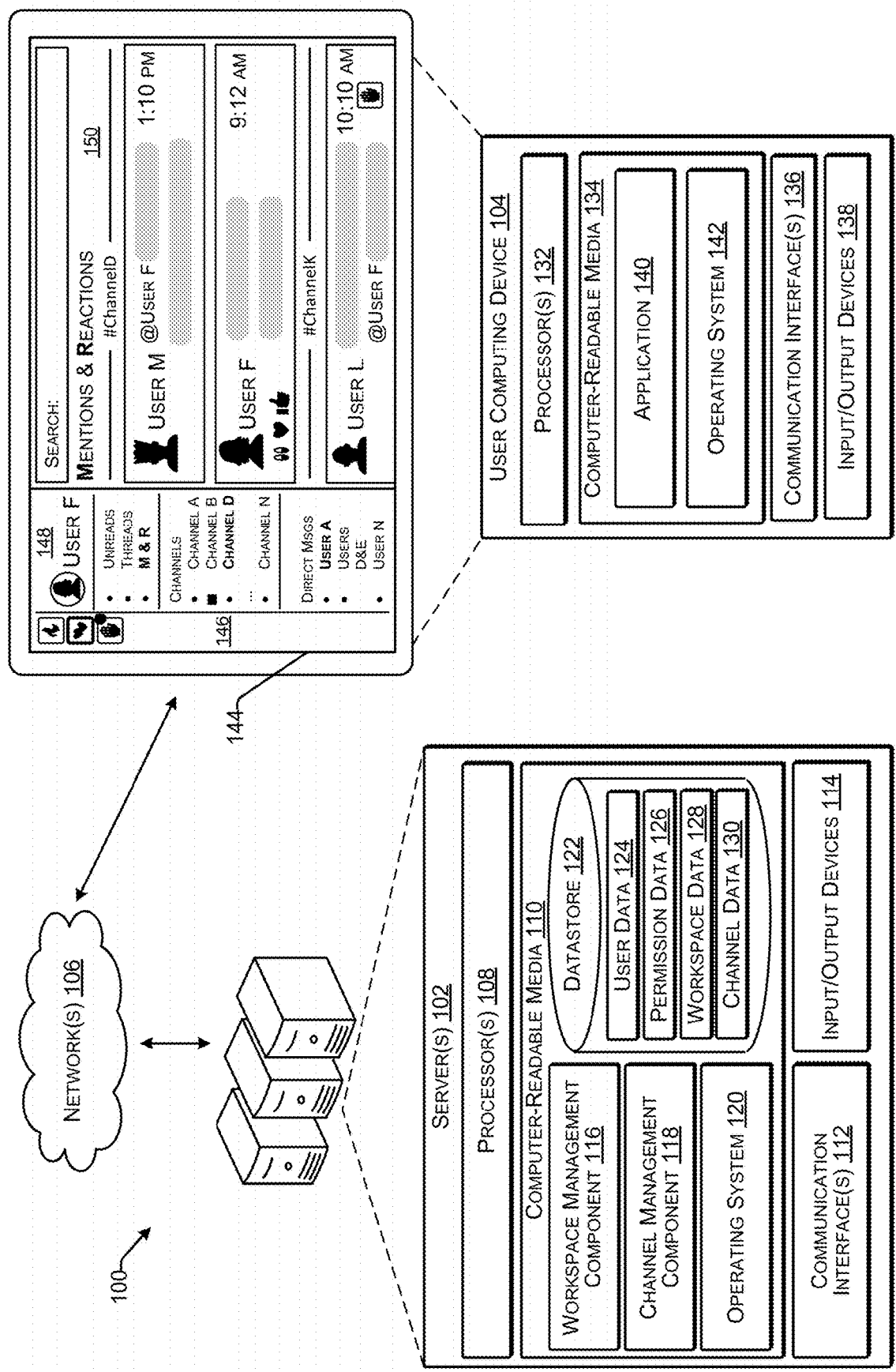
FIG. 1 illustrates an example environment for displaying communication channels within a group-based communication platform, according to some embodiments.

According to various embodiments, systems and methods described herein enable users of a group-based communication platform to share group-based communication channels with other users of the group-based communication platform. A first user may select a set of channels displayed to the first user in an group-based communication platform user interface associated with the first user and may generate a request to share the selected set of communication channels with one or more other users. In response to the first user's request to share the selected channels, an option to add at least some of the selected channels to a group-based communication platform user interface associated with a second user may be provided to the second user. In response to the second user's affirmative selection of the option, at least some of the selected channels may be added to the user interface associated with the second user. Thus, group-based communication channels may be quickly and easily be shared between different users.

According to various embodiments, enabling users to quickly and easily share channels may provide an easier and more efficient manner of introducing users to relevant and/or useful channels than provided by word-of-mouth means or by manual searching. Sharing communication channels may advantageously ensure consistency with respect to which communication channels are accessed by the first user and the second user. Ensuring consistency between the first user and the second user may advantageously ensure that the second user will not miss important messages because he or she was not aware of a particular communication channel (e.g., because the second user is new to the platform, new to an organization, and/or new to a project).

In some embodiments, the first user may define one or more channel sections in which communication channels are grouped. The first user may share channels of a section by simply selecting the channel section. The channels may be added to the second user's user interface as a section—i.e., the channels may be organized in the same section in the second user's user interface as in the first user's user interface. According to various embodiments, channels may have access permissions and the second user may be provided with the option to add only those channels that the second user has permission to access regardless of whether the first user included in the request to share channels for which the second user does not have access rights. Therefore, according to various embodiments, where the first user requests to share a section, the second user may not be provided with all of the same channels if the second user does not have the access permissions for one or more of the shared channels.

A user may select the set of communication channels to share with one or more other users in a variety of different ways. For example, a user may drag the set of communication channels into a message that is sent between the user and at least one other user. In some embodiments, the message may be posted to a direct communication feed between the user and one other user such that the "drag-and-drop" generates an offer to share the channels with the other user. In some embodiments, the message may be posted to a group-based communication channel accessed by more than two users. Users who are in the channel or who have access to the channel may view the message and choose to add the section and corresponding channels that are posted in the message. Additionally or alternatively, the user may select a share option from a menu, and in some embodiments, may be provided with the option to share with an individual user or multiple users.

In some embodiments, where a user shares channels with multiple users, each recipient user may be provided with the option to add only those channels (of the shared set of channels) that the user has permission to access. Thus, one recipient user may add different channels than another recipient user where the two recipients have different access permissions.

In the following description of the various embodiments, reference is made to the accompanying drawings, in which are shown, by way of illustration, specific embodiments that can be practiced. It is to be understood that other embodiments and examples can be practiced, and changes can be made without departing from the scope of the disclosure.

In addition, it is also to be understood that the singular forms "a," "an," and "the" used in the following description are intended to include the plural forms as well, unless the context clearly indicates otherwise. It is also to be understood that the term "and/or" as used herein refers to and encompasses any and all possible combinations of one or more of the associated listed items. It is further to be understood that the terms "includes, "including," "comprises," and/or "comprising," when used herein, specify the presence of stated features, integers, steps, operations, elements, components, and/or units but do not preclude the presence or addition of one or more other features, integers, steps, operations, elements, components, units, and/or groups thereof.

Certain aspects of the present disclosure include process steps and instructions described herein in the form of an algorithm. It should be noted that the process steps and instructions of the present disclosure could be embodied in software, firmware, or hardware and, when embodied in software, could be downloaded to reside on and be operated from different platforms used by a variety of operating systems. Unless specifically stated otherwise as apparent from the following discussion, it is appreciated that, throughout the description, discussions utilizing terms such as "processing," "computing," "calculating," "determining," "displaying," "generating" or the like, refer to the action and processes of a computer system, or similar electronic computing device, that manipulates and transforms data represented as physical (electronic) quantities within the computer system memories or registers or other such information storage, transmission, or display devices.

The present disclosure in some embodiments also relates to a device for performing the operations herein. This device may be specially constructed for the required purposes, or it may comprise a general purpose computer selectively activated or reconfigured by a computer program stored in the computer. Such a computer program may be stored in a non-transitory, computer readable storage medium, such as, but not limited to, any type of disk, including floppy disks, USB flash drives, external hard drives, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The methods, devices, and systems described herein are not inherently related to any particular computer or other apparatus. Various general-purpose systems may also be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the present invention as described herein.

FIG. 1 illustrates an example environment 100 for performing techniques described herein. In at least one example, the example environment 100 can be associated with a communication platform that can leverage a network-based computing system to enable users of the communication platform to exchange data. In at least one example, the communication platform can be "group-based" such that the platform, and associated systems, communication channels, messages, and/or virtual spaces, have security (that can be defined by permissions) to limit access to a defined group of users. In some examples, such groups of users can be defined by group identifiers, as described above, which can be associated with common access credentials, domains, or the like. In some examples, the communication platform can be a hub, offering a secure and private virtual space to enable users to chat, meet, call, collaborate, transfer files or other data, or otherwise communicate between or among each other. As described above, each group can be associated with a workspace, enabling users associated with the group to chat, meet, call, collaborate, transfer files or other data, or otherwise communicate between or among each other in a secure and private virtual space. In some examples, members of a group, and thus workspace, can be associated with a same organization. In some examples, members of a group, and thus workspace, can be associated with different organizations (e.g., entities with different organization identifiers).

In at least one example, the example environment 100 can include one or more server computing devices (or "server (s)") 102. In at least one example, the server(s) 102 can include one or more servers or other types of computing devices that can be embodied in any number of ways. For example, in the example of a server, the functional components and data can be implemented on a single server, a cluster of servers, a server farm or data center, a cloud-hosted computing service, a cloud-hosted storage service, and so forth, although other computer architectures can additionally or alternatively be used.

In at least one example, the server(s) 102 can communicate with a user computing device 104 via one or more network(s) 106. That is, the server(s) 102 and the user computing device 104 can transmit, receive, and/or store data (e.g., content, information, or the like) using the network(s) 106, as described herein. The user computing device 104 can be any suitable type of computing device, e.g., portable, semi-portable, semi-stationary, or stationary. Some examples of the user computing device 104 can include a tablet computing device, a smart phone, a mobile communication device, a laptop, a netbook, a desktop computing device, a terminal computing device, a wearable computing device, an augmented reality device, an Internet of Things (TOT) device, or any other computing device capable of sending communications and performing the functions according to the techniques described herein. While a single user computing device 104 is shown, in practice, the example environment 100 can include multiple (e.g., tens of, hundreds of, thousands of, millions of) user computing devices. In at least one example, user computing devices, such as the user computing device 104, can be operable by users to, among other things, access communication services via the communication platform. A user can be an individual, a group of individuals, an employer, an enterprise, an organization, or the like.

The network(s) 106 can include, but are not limited to, any type of network known in the art, such as a local area network or a wide area network, the Internet, a wireless network, a cellular network, a local wireless network, Wi-Fi and/or close-range wireless communications, Bluetooth®, Bluetooth Low Energy (BLE), Near Field Communication (NFC), a wired network, or any other such network, or any combination thereof. Components used for such communications can depend at least in part upon the type of network, the environment selected, or both. Protocols for communicating over such network(s) 106 are well known and are not discussed herein in detail.

In at least one example, the server(s) 102 can include one or more processors 108, computer-readable media 110, one or more communication interfaces 112, and input/output devices 114.

In at least one example, each processor of the processor(s) 108 can be a single processing unit or multiple processing units, and can include single or multiple computing units or multiple processing cores. The processor(s) 108 can be implemented as one or more microprocessors, microcomputers, microcontrollers, digital signal processors, central processing units (CPUs), graphics processing units (GPUs), state machines, logic circuitries, and/or any devices that manipulate signals based on operational instructions. For example, the processor(s) 108 can be one or more hardware processors and/or logic circuits of any suitable type specifically programmed or configured to execute the algorithms and processes described herein. The processor(s) 108 can be configured to fetch and execute computer-readable instructions stored in the computer-readable media, which can program the processor(s) to perform the functions described herein.

The computer-readable media 110 can include volatile and nonvolatile memory and/or removable and non-removable media implemented in any type of technology for storage of data, such as computer-readable instructions, data structures, program modules, or other data. Such computer-readable media 110 can include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired data and that can be accessed by a computing device. Depending on the configuration of the server(s) 102, the computer-readable media 110 can be a type of computer-readable storage media and/or can be a tangible non-transitory media to the extent that when mentioned, non-transitory computer-readable media exclude media such as energy, carrier signals, electromagnetic waves, and signals per se.

The computer-readable media 110 can be used to store any number of functional components that are executable by the processor(s) 108. In many implementations, these functional components comprise instructions or programs that are executable by the processor(s) 108 and that, when executed, specifically configure the processor(s) 108 to perform the actions attributed above to the server(s) 102. Functional components stored in the computer-readable media can optionally include a workspace management component 116, a channel management component 118, an operating system 120, and a datastore 122.

In at least one example, the workspace management component 116 can manage workspaces. That is, in at least one example, the communication platform can be partitioned into different workspaces, which can be associated with different groups of users, as described above. As described above, each workspace can be associated with a group identifier and one or more user accounts can be mapped to, or otherwise associated with, the group identifier. User(s) corresponding to such user account(s) can be "members" of the group.

In some examples, the workspace management component 116 can manage workspace membership. That is, the workspace management component 116 can receive requests to associate users with individual workspaces and the workspace management component 116 can associate user accounts associated with such users with group identifiers associated with the individual workspaces. For example, responsive to receiving a request to add a user to a workspace, the workspace management component 116 can associate a user account of the user with a group identifier of the workspace. The workspace management component 116 can disassociate user accounts and group identifiers, for example, when a user is removed from a workspace.

In at least one example, the workspace management component 116 can manage cross-workspace data integration, as described herein. For example, the workspace management component 116 can detect updates to data associated with a workspace and can integrate such updated data into user interface(s) presented via user computing device(s) of user(s) associated with the workspace. Such data integration can be "cross-workspace" such that, regardless of which workspace a user is logged in to, the user can receive updated data associated with each of the workspaces of which he or she is a member and/or access data associated with each of the workspaces of which he or she is a member (pending permissions, as described below). That is, the workspace management component 116 can detect updates to data associated with a workspace and can integrate such updated data into user interface(s) presented via user computing device(s) of user(s) associated with the workspace. Similarly, the workspace management component 116 can facilitate cross-workspace operations. For example, the workspace management component 116 can facilitate messages between workspaces, searches between or across multiple workspaces, and the like. Additional details of operations that can be performed by the workspace management component 116 are described below.

In at least one example, the channel management component 118 can manage communication channels. As described above, in at least one example, the communication platform can be a channel-based messaging platform, that in some examples, can be usable by group(s) of users. Users of the communication platform can communicate with other users via communication channels. A communication channel, or virtual space, can be a data route used for exchanging data between and among systems and devices associated with the communication platform. In at least one example, the channel management component 118 can establish a communication channel between and among various user computing devices, allowing the user computing devices to communicate and share data between and among each other. In at least one example, the channel management component 118 can manage such communications and/or sharing of data. In some examples, data associated with a communication channel can be presented via a user interface. In at least one example, the channel management component 118 can interact with the workspace management component 116 to manage the generation, presentation, and/or updating of user interfaces. Additional details of operations that can be performed by the channel management component 118 are described below.

In at least one example, the operating system 120 can manage the processor(s) 108, computer-readable media 110, hardware, software, etc. of the server(s) 102.

In at least one example, the datastore 122 can be configured to store data that is accessible, manageable, and updatable. In some examples, the datastore 122 can be integrated with the server(s) 102, as shown in FIG. 1. In other examples, the datastore 122 can be located remotely from the server(s) 102 and can be accessible to the server(s) 102 and/or user device(s), such as the user device 104. The datastore 122 can comprise multiple databases, which can include user data 124, permission data 126, workspace data 128, and channel data 130. Additional or alternative data may be stored in the data store and/or one or more other data stores.

In at least one example, the user data 124 can store data associated with users of the communication platform. In at least one example, the user data 124 can store data in user profiles (which can also be referred to as "user accounts"), which can store data associated with a user, including, but not limited to, one or more user identifiers associated with multiple, different organizations or entities with which the user is associated, one or more communication channel identifiers associated with communication channels to which the user has been granted access, one or more group identifiers for groups (or, organizations, teams, entities, or the like) with which the user is associated, an indication whether the user is an owner or manager of any communication channels, an indication whether the user has any communication channel restrictions, a plurality of messages, a plurality of emojis, a plurality of conversations, a plurality of conversation topics, an avatar, an email address, a real name (e.g., John Doe), a username (e.g., j doe), a password, a time zone, a status, a token, and the like.

In at least one example, the permission data 126 can store data associated with permissions of individual users of the communication platform. In some examples, permissions can be set automatically or by an administrator of the communication platform, an employer, enterprise, organization, or other entity that utilizes the communication platform, a team leader, a group leader, or other entity that utilizes the communication platform for communicating with team members, group members, or the like, an individual user, or the like. In some examples, permissions associated with an individual user can be mapped to, or otherwise associated with, an account or profile associated with the user data 124. In some examples, permissions can indicate which users can communicate directly with other users, which channels a user is permitted to access, restrictions on individual channels, which workspaces the user is permitted to access, restrictions on individual workspaces, and the like. In at least one example, the permissions can support the communication platform by maintaining security for limiting access to a defined group of users. In some examples, such users can be defined by common access credentials, group identifiers, or the like, as described above.

In at least one example, the workspace data 128 can store data associated with individual workspaces. As described above, the communication platform can be partitioned into workspaces associated with groups of users. In at least one example, a group identifier can be associated with a workspace. In at least one example, the group identifier can indicate a physical address in the workspace data 128 where data related to the corresponding workspace is stored. In at least one example, data associated with workspace permissions can be stored in association with the group identifier, data identifying users associated with the workspace can be stored in association with the group identifier, data associated with messages and/or other content associated with the workspace can be stored in association with the group identifier, data associated with communication channels associated with the workspace can be stored in association with the group identifier, and the like. In some examples, workspaces can be associated with one or more organization identifiers, which can be associated with organizations or other entities associated with the communication platform. In some examples, such data can be mapped to, or otherwise associated with, other types of data in the datastore 122 (e.g., the user data 124, the permission data 126, the channel data 130, etc.).

In at least one example, the channel data 130 can store data associated with individual communication channels. In at least one example, the channel management component 118 can establish a communication channel between and among various user computing devices, allowing the user computing devices to communicate and share data between and among each other. In at least one example, a communication channel identification may be assigned to a communication channel, which indicates the physical address in the channel data 130 where data related to that communication channel is stored. A communication channel may be "public," which may allow any user within an organization (e.g., associated with an organization identifier) to join and participate in the data sharing through the communication channel, or a communication channel may be "private," which may restrict data communications in the communication channel to certain users or users having particular roles (e.g., managers, administrators, etc.). In some examples, a communication channel may be "shared," which may allow users associated with different organizations (e.g., entities associated with different organization identifiers) to join and participate in the data sharing through the communication channel. Shared channels may be public such that they are accessible to any user of either organization, or they may be private such that they are restricted to access by certain users or users having particular roles from both organizations.

In some examples, the datastore 122 can be partitioned into discrete items of data that may be accessed and managed individually (e.g., data shards). Data shards can simplify many technical tasks, such as data retention, unfurling (e.g., detecting that message contents include a link, crawling the link's metadata, and determining a uniform summary of the metadata), and integration settings. In some examples, data shards can be associated with organizations, groups (e.g., workspaces), communication channels, users, or the like.

In some examples, individual organizations can be associated with a database shard within the datastore 122 that stores data related to a particular organization identification. For example, a database shard may store electronic communication data associated with members of a particular organization, which enables members of that particular organization to communicate and exchange data with other members of the same organization in real time or near-real time. In this example, the organization itself can be the owner of the database shard and has control over where and how the related data is stored. In some examples, a database shard can store data related to two or more organizations (e.g., as in a shared channel).

In some examples, individual groups can be associated with a database shard within the datastore 122 that stores data related to a particular group identification (e.g., workspace). For example, a database shard may store electronic communication data associated with members of a particular group, which enables members of that particular group to communicate and exchange data with other members of the same group in real time or near-real time. In this example, the group itself can be the owner of the database shard and has control over where and how the related data is stored.

In some examples, a communication channel can be associated with a database shard within the datastore 122 that stores data related to a particular channel identification. For example, a database shard may store electronic communication data associated with the communication channel, which enables members of that particular communication channel to communicate and exchange data with other members of the same communication channel in real time or near-real time. In this example, a group or organization can be the owner of the database shard and can control where and how the related data is stored.

In some examples, individual users can be associated with a database shard within the datastore 122 that stores data related to a particular user account. For example, a database shard may store electronic communication data associated with an individual user, which enables the user to communicate and exchange data with other users of the communication platform in real time or near-real time. In some examples, the user itself can be the owner of the database shard and has control over where and how the related data is stored.

The communication interface(s) 112 can include one or more interfaces and hardware components for enabling communication with various other devices (e.g., the user computing device 104), such as over the network(s) 106 or directly. In some examples, the communication interface(s) 112 can facilitate communication via Websockets, Application Programming Interfaces (APIs) (e.g., using API calls), HyperText Transfer Protocols (HTTPs), etc.

The server(s) 102 can further be equipped with various input/output devices 114 (e.g., I/O devices). Such I/O devices 114 can include a display, various user interface controls (e.g., buttons, joystick, keyboard, mouse, touch screen, etc.), audio speakers, connection ports and so forth.

In at least one example, the user computing device 104 can include one or more processors 132, computer-readable media 134, one or more communication interfaces 136, and input/output devices 138.

In at least one example, each processor of the processor(s) 132 can be a single processing unit or multiple processing units, and can include single or multiple computing units or multiple processing cores. The processor(s) 132 can comprise any of the types of processors described above with reference to the processor(s) 108 and may be the same as or different than the processor(s) 108.

The computer-readable media 134 can comprise any of the types of computer-readable media 134 described above with reference to the computer-readable media 110 and may be the same as or different than the computer-readable media 110. Functional components stored in the computer-readable media can optionally include at least one application 140 and an operating system 142.

In at least one example, the application 140 can be a mobile application, a web application, or a desktop application, which can be provided by the communication platform or which can be an otherwise dedicated application. In some examples, individual user computing devices associated with the environment 100 can have an instance or versioned instance of the application 140, which can be downloaded from an application store, accessible via the Internet, or otherwise executable by the processor(s) 132 to perform operations as described herein. That is, the application 140 can be an access point, enabling the user computing device 104 to interact with the server(s) 102 to access and/or use communication services available via the communication platform. In at least one example, the application 140 can facilitate the exchange of data between and among various other user computing devices, for example via the server(s) 102. In at least one example, the application 140 can present user interfaces, as described herein. In at least one example, a user can interact with the user interfaces via touch input, keyboard input, mouse input, spoken input, or any other type of input.

A non-limiting example of a user interface 144 is shown in FIG. 1. As illustrated in FIG. 1, the user interface 144 can present data associated with one or more communication channels and, in some examples, one or more workspaces. That is, in some examples, the user interface can integrate data from multiple workspaces into a single user interface so that the user (e.g., of the user computing device 104) can access and/or interact with data associated with the multiple workspaces that he or she is associated with and/or otherwise communicate with other users associated with the multiple workspaces. In some examples, the user interface 144 can include a first region 146, or pane, that includes indicator(s) (e.g., user interface element(s) or object(s)) associated with workspace(s) with which the user (e.g., account of the user) is associated. In some examples, the user interface 144 can include a second region 148, or pane, that includes indicator(s) (e.g., user interface element(s) or object(s)) representing data associated with the workspace(s) with which the user (e.g., account of the user) is associated. Additional details associated with the second region 148 and indicator(s) are described below with reference to FIG. 2.

In at least one example, the user interface 144 can include a third region 150, or pane, that can be associated with a data feed (or, "feed") indicating messages posted to and/or actions taken with respect to one or more communication channels and/or other virtual spaces for facilitating communications (e.g., a virtual space associated with direct message communication(s), a virtual space associated with event(s) and/or action(s), etc.) as described herein. In at least one example, data associated with the third region 150 can be associated with the same or different workspaces. That is, in some examples, the third region 150 can present data associated with the same or different workspaces via an integrated feed. In some examples, the data can be organized and/or is sortable by workspace, time (e.g., when associated data is posted or an associated operation is otherwise performed), type of action, communication channel, user, or the like. In some examples, such data can be associated with an indication of which user (e.g., member of the communication channel) posted the message and/or performed an action. In examples where the third region 150 presents data associated with multiple workspaces, at least some data can be associated with an indication of which workspace the data is associated with. Additional details associated with the user interface 144, and the third region 150, are described below with reference to FIG. 2.

In at least one example, the operating system 142 can manage the processor(s) 132, computer-readable media 134, hardware, software, etc. of the server(s) 102.

The communication interface(s) 136 can include one or more interfaces and hardware components for enabling communication with various other devices (e.g., the user computing device 104), such as over the network(s) 106 or directly. In some examples, the communication interface(s) 136 can facilitate communication via Websockets, APIs (e.g., using API calls), HTTPs, etc.

The user computing device 104 can further be equipped with various input/output devices 138 (e.g., I/O devices). Such I/O devices 138 can include a display, various user interface controls (e.g., buttons, joystick, keyboard, mouse, touch screen, etc.), audio speakers, connection ports and so forth.

While techniques described herein are described as being performed by the workspace management component 116, the channel management component 118, and the application 140, techniques described herein can be performed by any other component, or combination of components, which can be associated with the server(s) 102, the user computing device 104, or a combination thereof.

Figure 2:
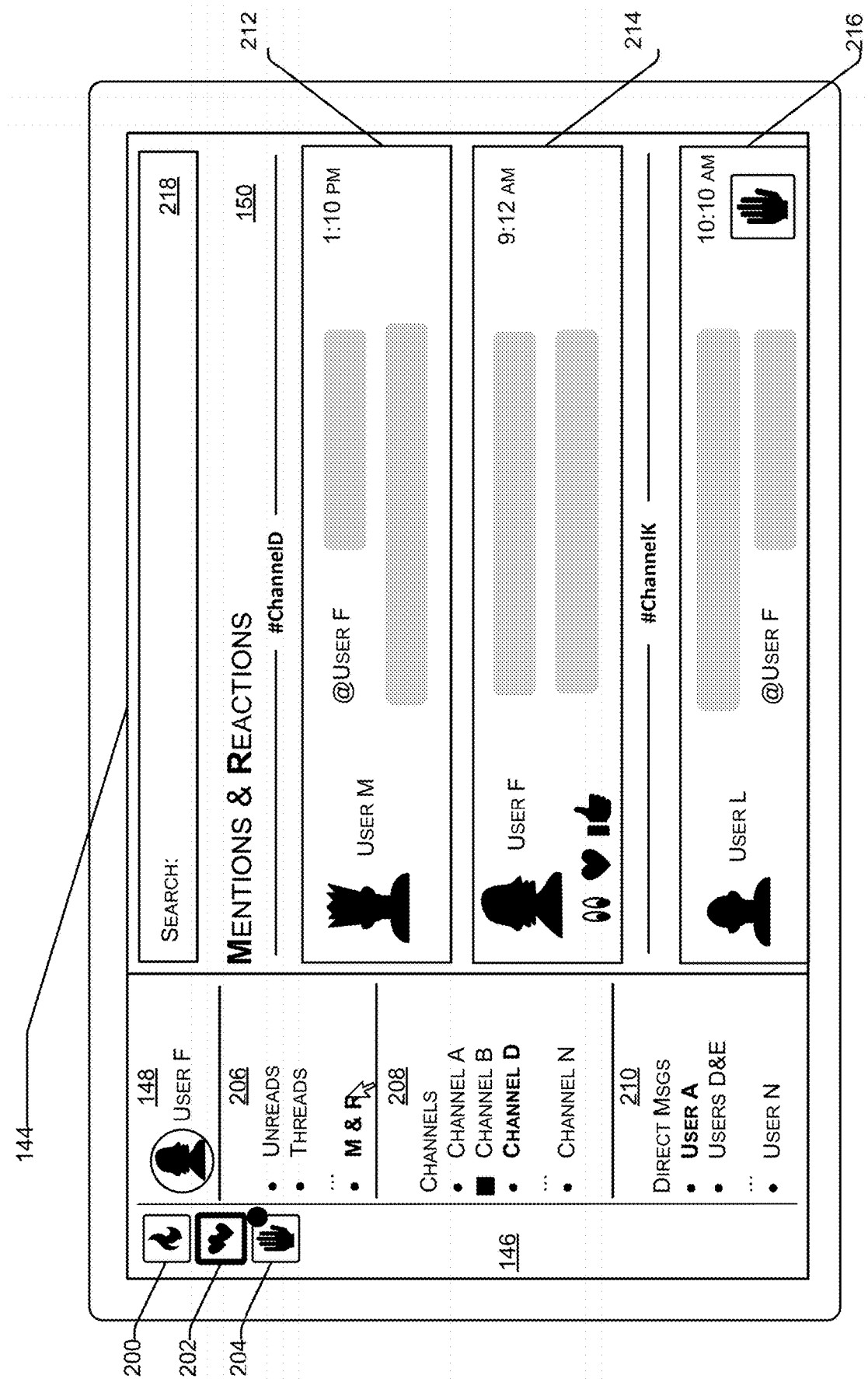
FIG. 2 illustrates aspects of a user interface associated with the group-based communication platform, according to some embodiments.

FIG. 2 illustrates additional details associated with the user interface 144 that presents data associated with multiple workspaces, as described above with reference to FIG. 1.

As described above, in at least one example, the user interface 144 can include a first region 146, or pane, that includes indicator(s) (e.g., user interface element(s) or object(s)) of workspace(s) with which the user (e.g., account of the user) is associated. As illustrated in FIG. 2, the user can be associated with three different workspaces. In some examples, the workspaces can be associated with a same organization (e.g., associated with a same organization identifier). In some examples, one or more of the workspaces can be associated with different organizations (e.g., associated with different organization identifiers). In some examples, one of the workspaces can be associated with users from a single organization (e.g., associated with a same organization identifier) and another of the workspaces can be associated with users from two or more different organizations (e.g., associated with different organization identifiers).

In at least one example, each workspace can be associated with a different indicator 200-204, presented via the first region 146. In at least one example, a user account of the user can be associated with group identifiers that correspond to each of the workspaces (e.g., as determined by the user data 124 and/or the workspace data 128). As such, the user account of the user can be associated with each of the workspaces. A first indicator 200 can represent a first workspace, a second indicator 202 can represent a second workspace, and a third indicator 204 can represent a third workspace.

In some examples, the user can navigate between the workspaces by actuating a control associated with each of the indicators 200-204 without needing to log out of one workspace and log in to each of the other workspaces. Non-limiting examples of such indicators, or any indictors described herein, can include icons, symbols, links, tabs, or other user interface elements or objects. In some examples, such indicators can be associated with actuation mechanisms to enable a user to select an indicator and transition to another workspace. In some examples, a visual indicator can indicate which workspace a user is currently interacting with and/or most recently interacted with. For example, the second indicator 202 is outlined in a heavier weight than the first indicator 200 and the third indicator 204, thereby indicating which workspace the user is currently interacting with and/or most recently interacted with. In some examples, the indicators 200-204 can be associated with another indicator indicating that the corresponding workspace has been updated. An example is shown with respect to the third indicator 204.

While three indicators 200-204 are illustrated in FIG. 2, the user can be associated with any number of workspaces. In some examples, indicators associated with all of the workspaces with which a user is associated can be presented via the first region 146. In some examples, some of the indicators associated with all of the workspaces with which a user is associated can be presented via the first region 146 and the user can interact with the user interface 144 to view additional or alternative indicators. In examples where fewer than all workspaces are represented via the user interface 144, the indicators can be arranged in alphabetical order, in an order of most recent interaction, in an order based on most frequent interaction, or some other order.

In some examples, the first region 146 may not be included in the user interface 144, and such information can be integrated into the user interface 144 via additional or alternative mechanisms.

In some examples, the user interface 144 can include a second region 148, or pane, that includes indicator(s) (e.g., user interface element(s) or object(s)) representing virtual space(s) associated with the workspace(s) with which the user (e.g., account of the user) is associated. In at least one example, the second region 148 can include one or more sub-sections, or sub-panes, which can represent different virtual spaces. For example, a first sub-section 206 can include indicators representing virtual spaces that can aggregate data associated with a plurality of communication channels and/or workspaces. In at least one example, each virtual space can be associated with an indicator in the first sub-section 206. In some examples, an indicator can be associated with an actuation mechanism that when actuated, can cause the application 140 to present data associated with the corresponding virtual space via the third region 150. In at least one example, a virtual space can be associated with all unread data associated with each of the workspaces with which the user is associated. That is, in some examples, if the user requests to access the virtual space associated with "unreads," all data that has not been read (e.g., viewed) by the user can be presented in the third region 150, for example in a feed. In such examples, different types of events and/or actions, which can be associated with different communication channels and/or virtual spaces, can be presented via a same feed. In some examples, such data can be organized and/or is sortable by workspace, time, type of action, communication channel, user, or the like. In some examples, such data can be associated with an indication of which user (e.g., member of the communication channel) posted the message and/or performed an action.

In some examples, each virtual space can be associated with a same type of event and/or action. For example, "threads" can be associated with messages, files, etc. posted in threads to messages posted in a communication channel and "mentions and reactions" (e.g., "M & R") can be associated with messages or threads where the user has been mentioned (e.g., via a tag) or another user has reacted (e.g., via an emoji, reaction, or the like) to a message or thread posted by the user. That is, in some examples, same types of events and/or actions, which can be associated with different communication channels and/or virtual spaces, can be presented via a same feed. As with the "unreads" virtual space, data associated with such virtual spaces can be organized and/or is sortable by workspace, time, type of action, type of message, communication channel, user, or the like.

In at least one example, the second region 148 of the user interface 144 can include a second sub-section 208, or sub-pane, that includes indicators representing communication channels. In some examples, the communication channels can include public channels, private channels, shared channels (e.g., between groups or organizations), single workspace channels, cross-workspace channels, combinations of the foregoing, or the like. In some examples, the communication channels represented can be associated with a single workspace. In some examples, the communication channels represented can be associated with different workspaces (e.g., cross-workspace). In at least one example, if a communication channel is cross-workspace (e.g., associated with different workspaces), the user may be associated with both workspaces, or may only be associated with one of the workspaces. In some examples, the communication channels represented can be associated with combinations of communication channels associated with a single workspace and communication channels associated with different workspaces.

In some examples, the second sub-section 208 can depict all communication channels, or a subset of all communication channels, that the user has permission to access (e.g., as determined by the permission data 126). In such examples, the communication channels can be arranged alphabetically, based on most recent interaction, based on frequency of interactions, based on communication channel type (e.g., public, private, shared, cross-workspace, etc.), based on workspace, in user-designated sections, or the like. In some examples, the second sub-section 208 can depict all communication channels, or a subset of all communication channels, that the user is a member of, and the user can interact with the user interface 144 to browse or view other communication channels that the user is not a member of but are not currently displayed in the second sub-section 208. In some examples, different types of communication channels (e.g., public, private, shared, cross-workspace, etc.) can be in different sections of the second sub-section 208, or can have their own sub-regions or sub-panes in the user interface 144. In some examples, communication channels associated with different workspaces can be in different sections of the second sub-section 208, or can have their own regions or panes in the user interface 144.

In some examples, the indicators can be associated with graphical elements that visually differentiate types of communication channels. For example, Channel B is associated with a square visual element instead of a circle visual element. As a non-limiting example, and for the purpose of this discussion, the square visual element can indicate that the user is not a current member of Channel B, whereas the circle visual element can indicate that the user is a current member of Channels A, D, and N. In some examples, additional or alternative graphical elements can be used to differentiate between public communication channels, private communication channels, shared communication channels, communication channels associated with different workspaces, and the like. In other examples, communication channels that the user is not a current member of may not be displayed in the second sub-section 208 of the user interface 144. In such examples, the user may navigate to a different interface (not shown) to browse additional channels that are accessible to the user but to which the user is not currently a member.

In addition to the second sub-section 208, the second region 148 can include a third sub-section 210, or sub-pane, that can include indicators representative of communications with individual users or multiple specified users (e.g., instead of all, or a subset of, members of an organization). Such communications can be referred to as "direct messages." That is, the third sub-section 210, or sub-pane, can include indicators representative of virtual spaces that are associated with private messages between one or more users.

As described above, in at least one example, the user interface 144 can include a third region 150, or pane, that is associated with a feed indicating messages posted to and/or actions taken with respect to a communication channel and/or other virtual space (e.g., a virtual space associated with direct message communication(s), a virtual space associated with event(s) and/or action(s), etc.) for facilitating communications. As described above, in at least one example, data associated with the third region 150 can be associated with the same or different workspaces. That is, in some examples, the third region 150 can present data associated with the same or different workspaces via an integrated feed. In some examples, the data can be organized and/or is sortable by workspace, time, type of action, communication channel, user, or the like. In some examples, such data can be associated with an indication of which user posted the message and/or performed an action. In examples where the third region 150 presents data associated with multiple workspaces, at least some data can be associated with an indication of which workspace the data is associated with.

For example, in FIG. 2, the user can interact with the user interface 144 to view data associated with the virtual space corresponding to "mentions and reactions." In FIG. 2, data associated with the virtual space can be associated with different communication channels and different workspaces. As illustrated, the data is organized by communication channel (e.g., #ChannelD and #ChannelK). However, as described above, the data can be organized and/or sortable by workspace, time, type of action, user, or the like. As illustrated, another user (e.g., User M) mentioned the user in a message, represented by the indicator 212 (e.g., a user interface element, object, etc.), which is associated with a communication channel (e.g., #ChannelD). The user also posted a message, represented by the indicator 214 (e.g., a user interface element, object, etc.), in the same communication channel. One or more other users reacted to the message, represented by the indicator 214, with an emoji. As such, indicators associated with both messages can be presented in the third region 150. Because the data is organized by communication channel, indicators associated with both messages are presented together. In at least one example, the communication channel (e.g., #ChannelD) can be associated with the second workspace (e.g., associated with the second indicator 202). In some examples, because the user is currently interacting with (or most recently interacted with) the second workspace, neither of the indicators 212 or 214 are associated with workspace indicators (e.g., the second indicator 202).

As illustrated, another user (e.g., User L) mentioned the user in a message, represented by the indicator 216 (e.g., a user interface element or object), which is associated with a communication channel (e.g., #ChannelK). As such, the indicator 216 can be presented in the third region 150. Because the data is organized by communication channel, the indicator 216 can be presented in a different position in the feed than the other indicators 212 and 214. In at least one example, the communication channel (e.g., #ChannelK) can be associated with the third workspace (e.g., associated with the third indicator 204). In some examples, because the user is currently interacting with (or most recently interacted with) the second workspace, the indicator 216 may include an indicator indicating that it is associated with the third workspace (e.g., the third indicator 204).

For purposes of this discussion, a "message" can refer to any electronically generated digital object provided by a user using the user computing device 104 and that is configured for display within a communication channel and/or other virtual space for facilitating communications (e.g., a virtual space associated with direct message communication(s), etc.) as described herein. A message may include any text, image, video, audio, or combination thereof provided by a user (using a user computing device). For instance, the user may provide a message that includes text, as well as an image and a video, within the message as message contents. In such an example, the text, image, and video would comprise the message. Each message sent or posted to a communication channel of the communication platform can include metadata comprising a sending user identifier, a message identifier, message contents, a group identifier, a communication channel identifier, or the like. In at least one example, each of the foregoing identifiers may comprise American Standard Code for Information Interchange (ASCII) text, a pointer, a memory address, or the like.

In some examples, a user can comment on a message in a "thread." A thread can be a message associated with another message that is not posted to a communication channel, but instead is maintained within an object associated with the original message. Messages and/or threads can be associated with file(s), emoji(s), app(s), etc.

A communication channel or other virtual space can be associated with data and/or content other than messages, or data and/or content that is associated with messages. For example, non-limiting examples of additional data that can be presented via the third region 150 of the user interface 144 include members added to and/or removed from the communication channel, file(s) (e.g., file attachment(s)) uploaded and/or removed from the communication channel, application(s) added to and/or removed from the communication channel, post(s) (data that can be edited collaboratively, in near real-time by one or members of a communication channel) added to and/or removed from the communication channel, description added to, modified, and/or removed from the communication channel, modifications of properties of the communication channel, etc.

In some examples, the third region 150 can comprise a feed associated with a single communication channel. In such examples, data associated with the communication channel can be presented via the feed. In at least one example, data associated with a communication channel can be viewable to at least some of the users of a group of users associated with a same group identifier. In some examples, for members of a communication channel, the content of the communication channel (e.g., messaging communications) can be displayed to each member of the communication channel. For instance, a common set of group-based messaging communications can be displayed to each member of the communication channel such that the content of the communication channel (e.g., messaging communications) may not vary per member of the communication channel. In some examples, data associated with a communication channel can appear differently for different users (e.g., based on personal configurations, group membership, etc.).

In at least one example, the format of the individual communication channels or virtual spaces may appear differently to different users. In some examples, the format of the individual communication channels or virtual spaces may appear differently based on which workspace a user is currently interacting with or most recently interacted with. In some examples, the format of the individual communication channels or virtual spaces may appear differently for different users (e.g., based on personal configurations, group membership, etc.).

In at least one example, the user interface 144 can include a search mechanism 218, wherein a user can input a search term and the server(s) 102 can perform a search associated with the communication platform. In some examples, the search can be performed across each workspace with which the user is associated, or the search can be restricted to a particular workspace, based on a user specification.

The user interface 144 is a non-limiting example of a user interface that can be presented via the user computing device 104 (e.g., by the application 140). In some examples, the application 140 can receive data from the workspace management component 116 and/or channel management component 118 and the application 140 can generate and present the user interface 144 based on the data. In other examples, the application 140 can receive data from the channel management component 118 and instructions for generating the user interface 144 from the workspace management component 116 and/or channel management component 118. In such an example, the application 140 can present the user interface 144 based on the instructions. Additional or alternative data can be presented via a user interface and additional or alternative configurations can be imagined.

FIGS. 3A-G illustrate aspects of one or more exemplary user interfaces associated with a first user (hereinafter referred to as "User A") of a group-based communication platform. The interfaces illustrate sharing of communication channels by a first user of the group-based communication platform ("User A") with a second user of the group-based communication platform ("User B"). The interfaces may include any of the features discussed above with respect to interface 144; for brevity, the discussion of many of the features discussed above with respect to interface 144 is not repeated.

FIG. 3A illustrates aspects of an exemplary interface 300A interface associated with User A, according to various embodiments. As depicted in FIG. 3A, interface 300A includes region 148 (which may be referred to as a "sidebar region") and region 150 (which may be referred to as a "message region"), which include data associated with workspace(s) associated with User A. As shown and described with respect to region 148 of FIG. 2, the sidebar region may include indicators representative of message groups which User A has joined. The message groups may include communication channels, direct messages, and/or multi-party direct messages.

In some embodiments, User A may select a communication channel to share with User B. Enabling User A to share a communication channel may advantageously enable User B to quickly and easily join the shared communication channel rather than manually selecting to join the communication channel. Sharing the communication channel may be particularly advantageous if User B is unaware of the shared communication channel. Once User B has joined the shared communication channel, User A may gain confidence that User B will not miss an important message because he or she was not monitoring messages associated with the shared communication channel.

In some embodiments, User A can group communication channels into sections, reorder the sections, and/or reorder communication channels within the section. In some embodiments, a section is analogous to a folder in which a user may organize communications or files. In a section, User A may organize channels to make it easier to find channels related to a particular topic. For example, User A may group all announcement channels in an "announcement" section. Thus, the communication channels can be grouped and ordered according to the user's preferences. In these embodiments, User A can select a channel section to share at least one communication channel associated with the selected section. For example, User A can select a particular channel section relating to a particular topic (e.g., a channel section containing channels relevant to a particular project) to share at least one communication channel associated within the selected channel section. Enabling User A to share a channel section may advantageously enable User A to share a large amount of communication channels without individually selecting each communication channel he or she wishes to share. Sharing a large amount of communication channels may be particularly important when onboarding a new team member. Enabling User A to request to share a channel section rather than requiring User A to individually select each communication channel he or she wishes to share may be advantageous at least to (1) reduce the time required for and complexity of sharing communication channels; and (2) ensure that all relevant communication channels will be shared.

As shown and described with respect to region 148 of FIG. 2, communication channels may be grouped in section 208. In some embodiments, communication channels may be further organized into a plurality of user-defined channel sections by dividing section 208. For example, as shown in FIG. 3A, Channel A, Channel B, and Channel C may be grouped in section 208A, Channel D, Channel E, and Channel F may be grouped in section 208B, and Channel G and Channel H may be grouped in section 208C. Grouping the communication channels into user-defined channel sections advantageously enables User A to organize display of the communication channels in the interface based on personal preferences (e.g., based on importance of communication channels, similarity of communication channel topics, and/or frequency of interaction with communication channels).

In some embodiments, each channel section may be associated with a channel section header indicative of the communication channels grouped into the channel section. In some embodiments, a channel section header may comprise a text string indicative of a channel section name and/or a graphical identifier. For example, as shown in FIG. 3A, the channel section shown in channel section 208A is named Channel Section 1 (see text string 304A) and is associated with an asterisk (see graphical identifier 302A). Similarly, the channel section shown in channel section 208B is named Channel Section 2 (see text string 304B) and is associated with a circle (see graphical identifier 302B), and the channel section shown in channel section 208C is named Channel Section 3 (see text string 304C) and is associated with a rhombus (see graphical identifier 302C). While shown and described with respect to particular names and graphical identifiers, each channel section may be associated with any name and any graphical identifier (and may be customizable based on user preferences). Thus, when determining whether to share a channel section, User A may only need to view the channel section header associated with the channel section instead of viewing the indicator for each communication channel included in the channel section. This may be particularly useful if a channel section comprises many communication channels.

In some embodiments, User A may select a message group indicator displayed in sidebar region 148 to display messages associated with the corresponding message group in the message region. For example, to display direct messages associated with User B, User A may select the indicator corresponding to User B. Once selected, the indicator corresponding to User B may be reproduced in sub-region 308 of message region 150 and messages associated with User B may be displayed in a message feed within sub-region 310 of message region 150. As shown in FIG. 3A, sub-region 310 includes a message composer window 311, which enables User A to compose a message to send to the selected message group (e.g., as shown, User A may compose a message that is sent to User B). For the sake of clarity, FIG. 3A is not shown to include any messages within sub-region 310; refer to the description above with respect to FIG. 2 for a description regarding how messages are displayed in the message feed.

In some embodiments, User A may select a channel section to request to share at least one communication channel associated with the selected channel section with User B.

In some embodiments, User A may select a channel section for sharing in different ways, such as: (1) by dragging the selected channel section into a message that is shared between User A and User B (hereinafter referred to as the "drag-and-drop method"), and/or (2) by selecting a share option from a menu (hereinafter referred to as the "context-menu method"). Thus, a user may flexibly share a channel section according to a method that is most convenient to the user.

Figure 3B:
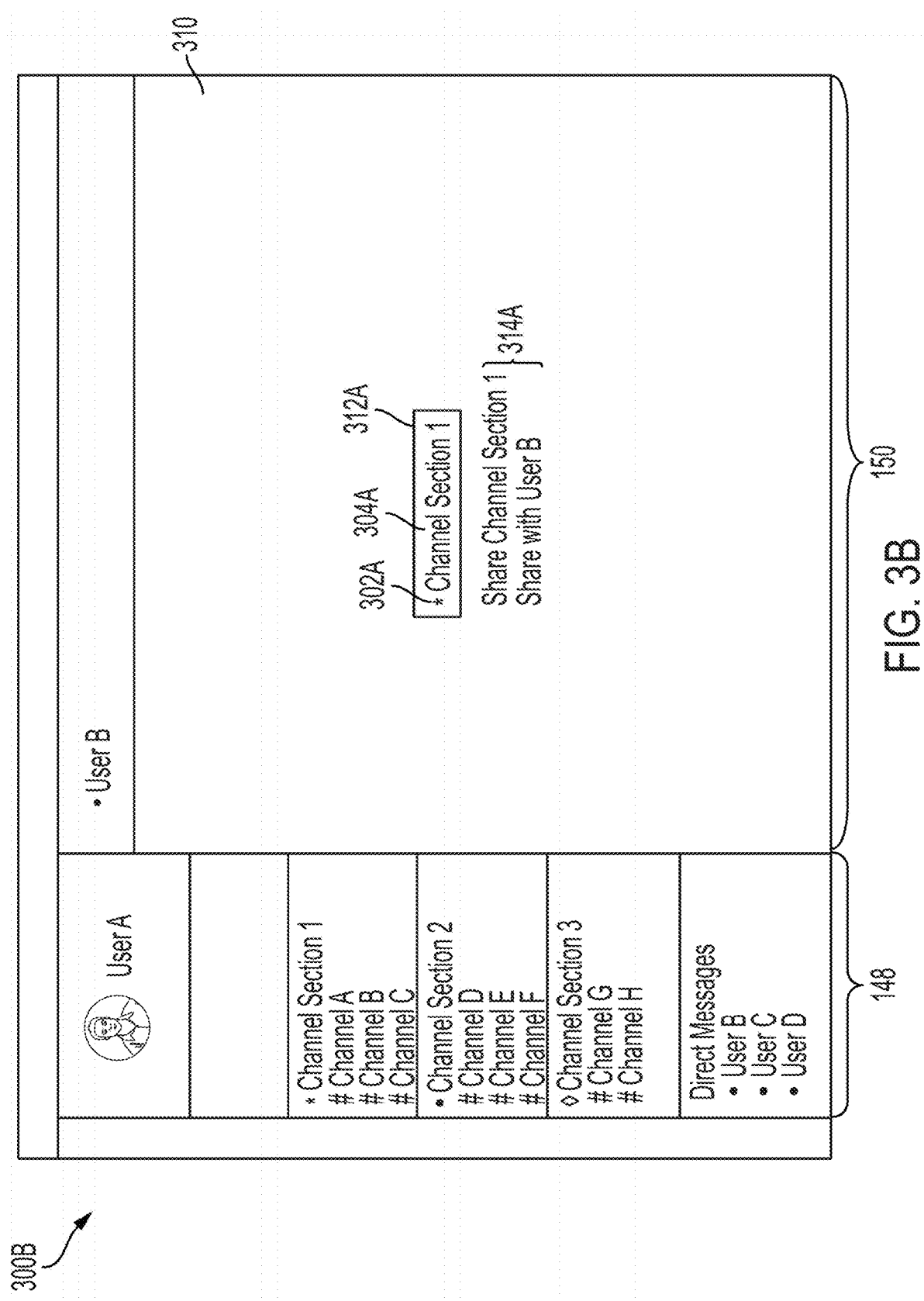

Interface 300B of FIG. 3B illustrates aspects of the drag-and-drop method of sharing a channel section, in which User A shares a selected channel section by dragging the selected channel section into a message between User A and User B, according to various embodiments. As shown in FIG. 3B, User A may be able to drag a channel section header from sidebar region 148 into a message feed within sub-region 310 of message region 150 to share a corresponding channel section with User B. For example, as depicted in FIG. 3B, User A may drag channel section header 312A, corresponding to Channel Section 1, into sub-region 310. Moreover, as depicted, when the channel section header is dragged from sidebar region 148 to message region 150, a copy of both the text string indicative of the channel section name and the graphical identifier associated with the channel section header may be dragged. In some embodiments, once a channel section header is dragged into a message that is then sent to User B, the channel section header and all channels associated with the channel section are selected to be shared with User B.

In some embodiments, once a channel section header is dragged into a message to be posted or sent to another user, a confirmation may be displayed to User A indicating which channel section User A has selected to share and/or with whom User A has selected to share the channel section. The confirmation indicating which channel section User A has selected to share and/or with whom User A has selected to share the channel section may be displayed to User A to confirm that he or she has begun the process of sharing an indicated section with an indicated user. For example, as shown in FIG. 3B, message 314A indicates to User A that he or she is sharing Channel Section 1 with User B. Additionally, in some embodiments, messages that were previously displayed may be omitted and/or greyed out at least to reduce clutter on the interface and/or to alert User A that he or she has begun the process of sharing the selected channel section.

In some embodiments, once a channel section header is dragged into the message feed, the selected channel section header and the associated channels may be displayed directly in a message composer window within the message feed. The message composer window allows a user to compose messages to send to other users. In some alternative embodiments, once a channel section header is dragged into the message feed, the selected channel section header and the associated channels may be displayed in a sharing window (as illustrated in FIG. 3D).

Figure 3C:
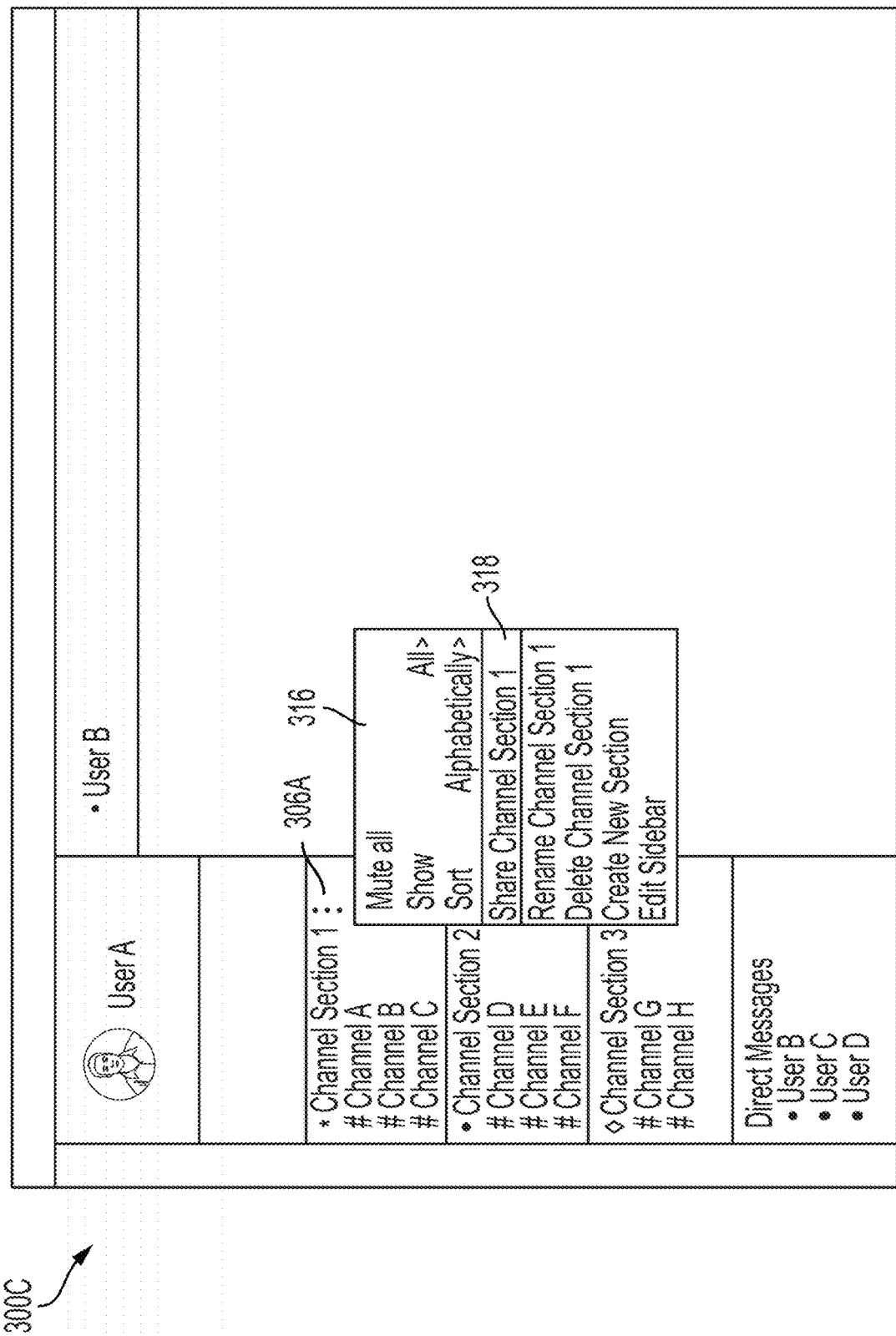
Figure 3D:
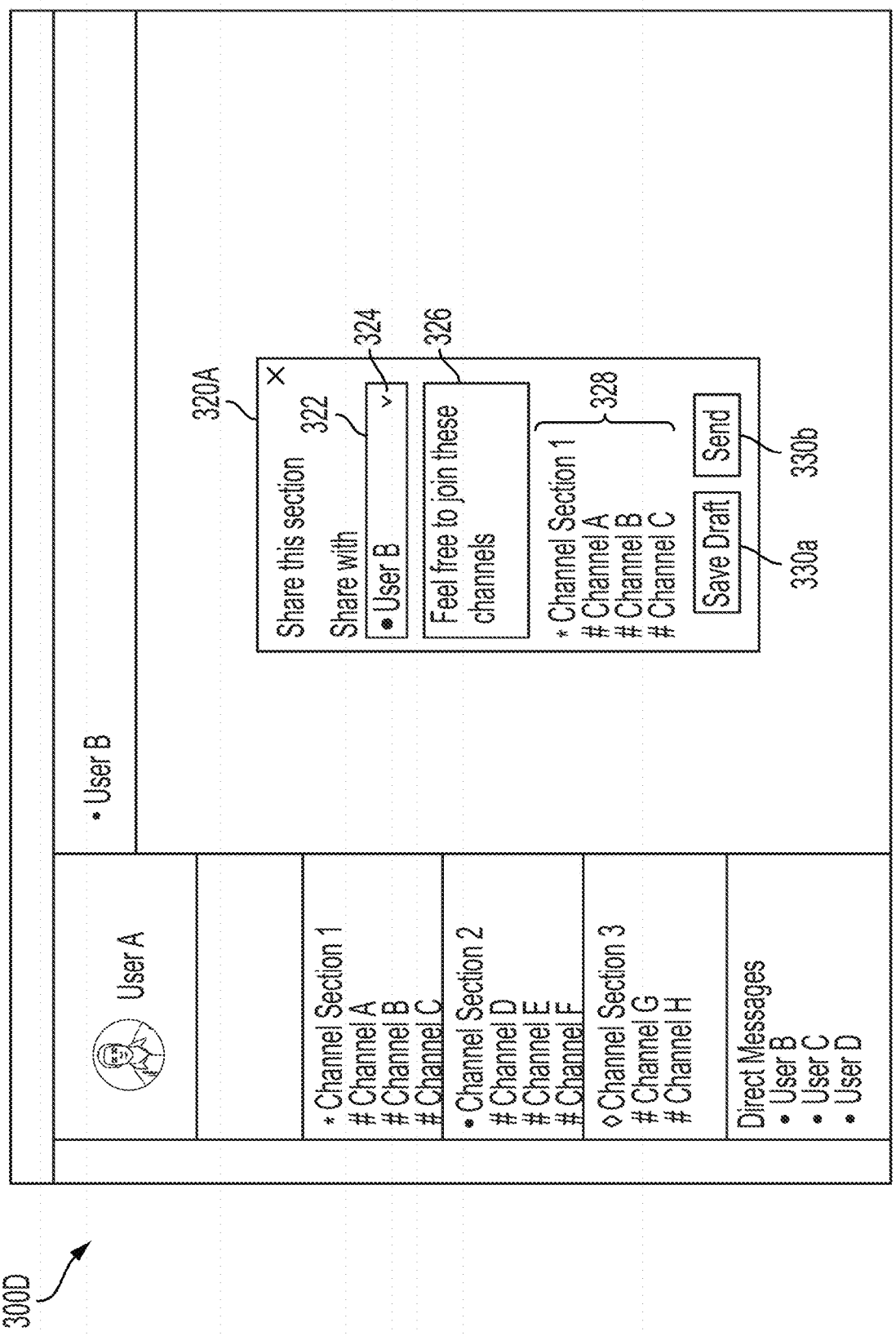

Interface 300C of FIG. 3C illustrates aspects of the context-menu method of sharing a channel section, in which User A shares a selected channel section by selecting a share option from a menu, according to various embodiments. As shown in FIG. 3C, User A may select a user affordance (e.g., user affordance 306A) to display the menu (e.g., menu 316), which includes a plurality of options for customizing the display of and/or sharing Channel Section 1. As shown in FIG. 3C, the plurality of options may include an option to mute all communication channels within the channel section, an option to hide one or more communication channels within the channel section, an option to sort communication channels within the channel section, an option to share the channel section, an option to rename the channel section, an option to delete the channel section, an option to create a new channel section, and/or an option to edit display of sidebar region 148. Upon selecting region 318 of menu 316 to share Channel Section 1, region 318 may be distinguished from other regions of the menu (e.g., by bolding and/or highlighting the region) to confirm to the user which option was selected. As will be discussed further with respect to FIG. 3D, User A may then select at least one other user (e.g., User B) with whom to share the selected channel section.

In some embodiments, upon selecting the channel section via one of the two methods described above, a sharing window (e.g., sharing window 320A) for generating a message to send to User B may be displayed. As discussed above, in some embodiments, selected channels and channel sections for sharing are not displayed in a separate sharing window, but are instead shown directly in a message composer window used for sending other types of messages (e.g., messages posted to channels, direct messages, etc.). In some embodiments, as will be discussed further with respect to FIG. 3E, the generated message may include a comment, an indication of the channel section header and communication channel(s) associated with the channel section shared, and/or a user affordance to add the channel section to the sidebar region. In some embodiments, the sharing window (e.g., sharing window 320A) may be used to select and/or modify with whom the message is shared, to add a comment to the message, and/or to view and/or modify the communication channel(s) that will be shared in the message. Interface 300D of FIG. 3D illustrates aspects of an exemplary embodiment of a sharing window 320A.

In some embodiments, sharing window 320A may include data field 322 for selecting and/or modifying with whom the message (and therefore the selected channel section) is shared. As described above with respect to FIG. 3B, in some embodiments, when selecting the channel section via the drag-and-drop method to select the channel section, a user (or users) with whom the selected channel section is shared may automatically be determined. Thus, data field 322 may automatically be filled (e.g., to indicate that the channel section will be shared with User B). Contrastingly, when following the context-menu method, User A may manually enter or select a user name (or a channel name) to fill data field 322. In either case, the user with whom to send the message may be modified. For example, in response to selection of a user affordance (e.g., user affordance 324), a drop-down menu indicating options of users (or channels) with whom to share the channel section may be displayed; User A may select an option different than one previously selected to modify the user(s) with whom to share the channel section.

In some embodiments, sharing window 320A may include a data field 326 for adding a comment to the message. In some embodiments, User A may type directly into data field 326 to add the comment. FIG. 3D is shown based on User A typing the comment "Feel free to join these channels" into data field 326. In some embodiments, adding a comment to the message is optional. Thus, User A may ignore data field 326 if he or she does not wish to add a comment to the message.

In some embodiments, sharing window 320A may include an indication of the channel section header and communication channel(s) that will be shared in the message. For example, as shown in FIG. 3D, the channel section header associated with Channel Section 1 and each communication channel associated with Channel Section 1 is shown in region 328 of the sharing window. Indicating the channel section header and the communication channel(s) may enable User A to review the channel section header and communication channel(s) that will be shared, and, if necessary, to modify the channel section header and/or the communication channel(s) that will be shared.

In some embodiments, sharing window 320A may include a user affordance for saving a draft of the message (e.g., button 330a) and/or a user affordance for sending the message (e.g., button 330b). In some embodiments, draft messages are automatically saved in the group-based communication platform without requiring a user to save a draft.

While not shown in FIG. 3D, in some embodiments, sharing window 320A may include a user affordance (e.g., a checkbox) displayed in associated with each indicator representative of a communication channel so that User A may provide an input to share only a subset of a set of communication channels associated with a channel section. Sharing only a subset of a set of communication channels associated with a channel section may advantageously provide increased flexibility when sharing communication channels, and may ensure that no channels are shared unnecessarily. In one example, User A may provide an input to share only Channel A and Channel C of Channel Section 1 with User B. Thus, the message may only include an indicator for each of Channel A and Channel C, and User B may not be able to tell that Channel B is also associated with Channel Section 1.

Moreover, while not shown in FIG. 3D, in some embodiments, User A may only share channels that User B has permission to access. For example, if User A is trying to share a private channel that User B does not have permission to access, the channel may not be selectable for sharing. In some embodiments, an indicator, blurring, or greyed out text may be displayed in association with a particular channel to indicate to User A that there is a channel that is not accessible to User B.

Figure 3E:
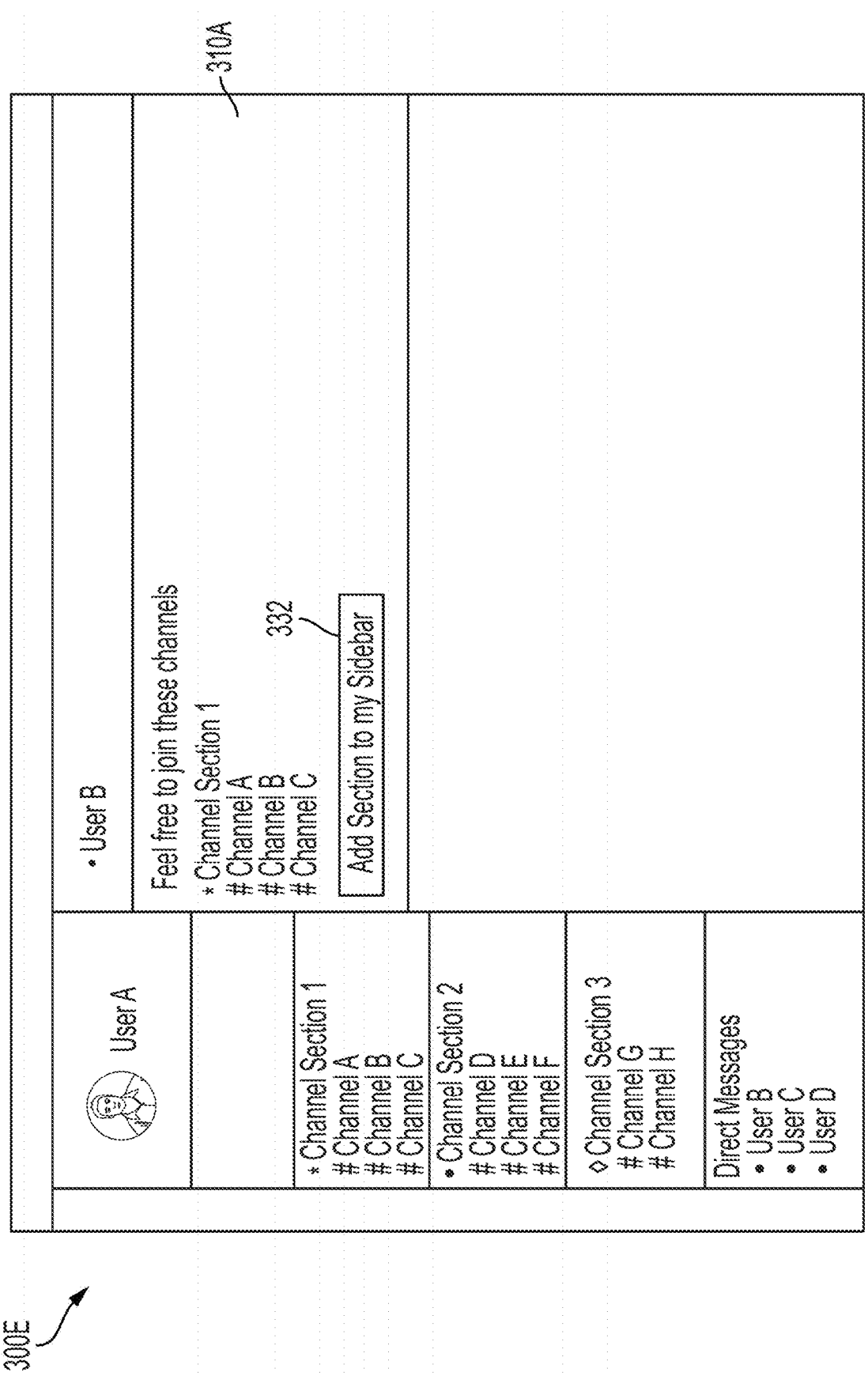

In some embodiments, in response to selection of the user affordance for sending the message, interface 300E of FIG. 3E may be displayed to User A. Interface 300E of FIG. 3E illustrates aspects of display of the generated message (message 310A) in a message feed associated with User B. As shown in FIG. 3E and discussed above with respect to FIG. 3D, the message may include a comment, an indication of the channel section header and the communication channel(s) associated with the channel section shared, and a user affordance (e.g., button 332) to add the channel section to the sidebar region. In some embodiments, the user affordance to add the channel section may appear in a context menu that is accessible by right clicking on the message. In some embodiments, clicking on the channel section header and/or an indicator corresponding to a channel associated with the channel section may cause a prompt indicating that the channels will be added to the user's sidebar to pop up. In some embodiments, the prompt may ask the user to confirm if he or she wants to proceed with adding the section of channels.

FIGS. 3D-E have been shown and described with respect to generating and sending a message to share a channel section with a user (User B). However, in some embodiments, a message to share one or more channels or a channel section may be posted in a channel (e.g., Channel D), where at least some users that can access the channel may view the message and choose to add the shared channel(s) or channel section and associated channels. This may be more efficient for a user that wants to share channels and/or sections with multiple other users. In some embodiments, posting a channel sharing message to a channel results in all members of the channel being permitted to view the message posted in the channel, which may include viewing the shared channel section(s) and associated channels. In some embodiments, at least some users that may access a channel to which a channel sharing message is posted may view the message but may not be permitted to add shared sections and/or one or more shared channels. In some embodiments, at least some users that may access the channel may not see the channel sharing message at all.

In some embodiments, whether a user that has access to a channel may be permitted to see a channel sharing message and/or may be permitted to add channels or channel sections via the channel sharing message may be based on permissions associated with the channel. Permissions may be defined for the channel itself, may be defined for the particular type of channel, may be defined for the particular organization(s) associated with the channel, and/or may be defined for different types of users. For example, in some embodiments, permissions may be set such that a channel sharing message posted to a private shared channel may be viewable by any member of the shared channel regardless of the organization of the member or, alternatively, permissions may be set such that the message is viewable only by a member of the same organization as the member that posted the channel sharing message. In some embodiments, users who can browse a channel but are not members of the channel may not be able to view the channel sharing message or may be able to view the channel sharing message but may not be able to view the channels being shared and/or may not be provided with the option to add the shared section and associated channels.

According to various embodiments, whether a particular user can see and/or add a given shared channel within a channel sharing message may be defined by permission settings similar to those discussed above with respect to the channel sharing message. In some embodiments, any specific channels shared within a channel sharing message that a user viewing the message may not access based on permissions may not be viewable by the user and/or may not be addable by the user. For example, a user that can access a channel may see a channel sharing message posted to the channel and may be permitted to add channels in the message that the user is a member of but may not be permitted to add channels in the message that the user is not a member of. In some embodiments, any channels that the user is not permitted to add (e.g., channels that the user is not a member of) are not displayed to the user in the channel sharing message. In some embodiments, the inaccessible channels are greyed out or a blank placeholder is displayed to indicate a channel that the user does not have permission to add.

Figure 3F:
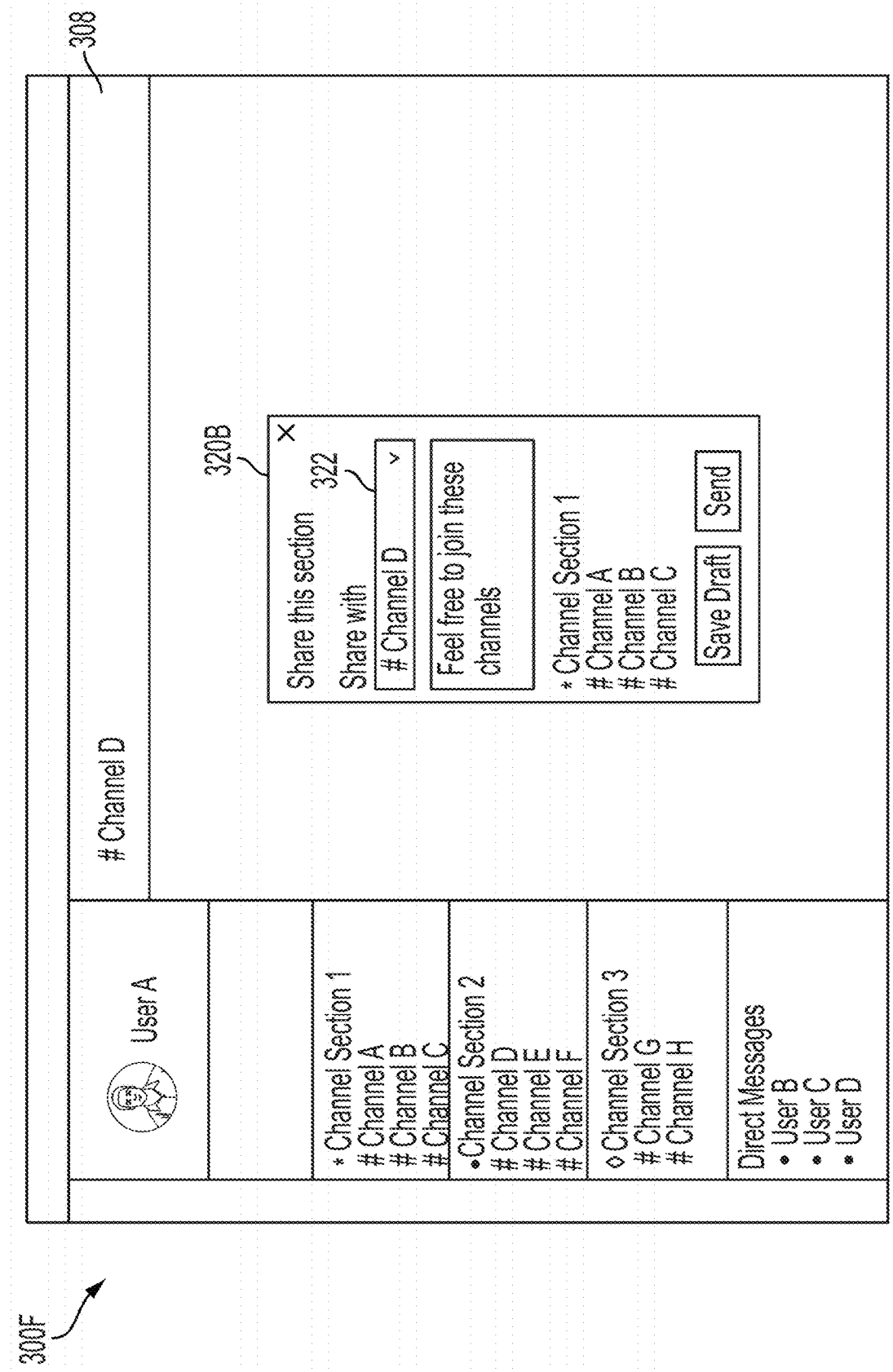
Figure 3G:
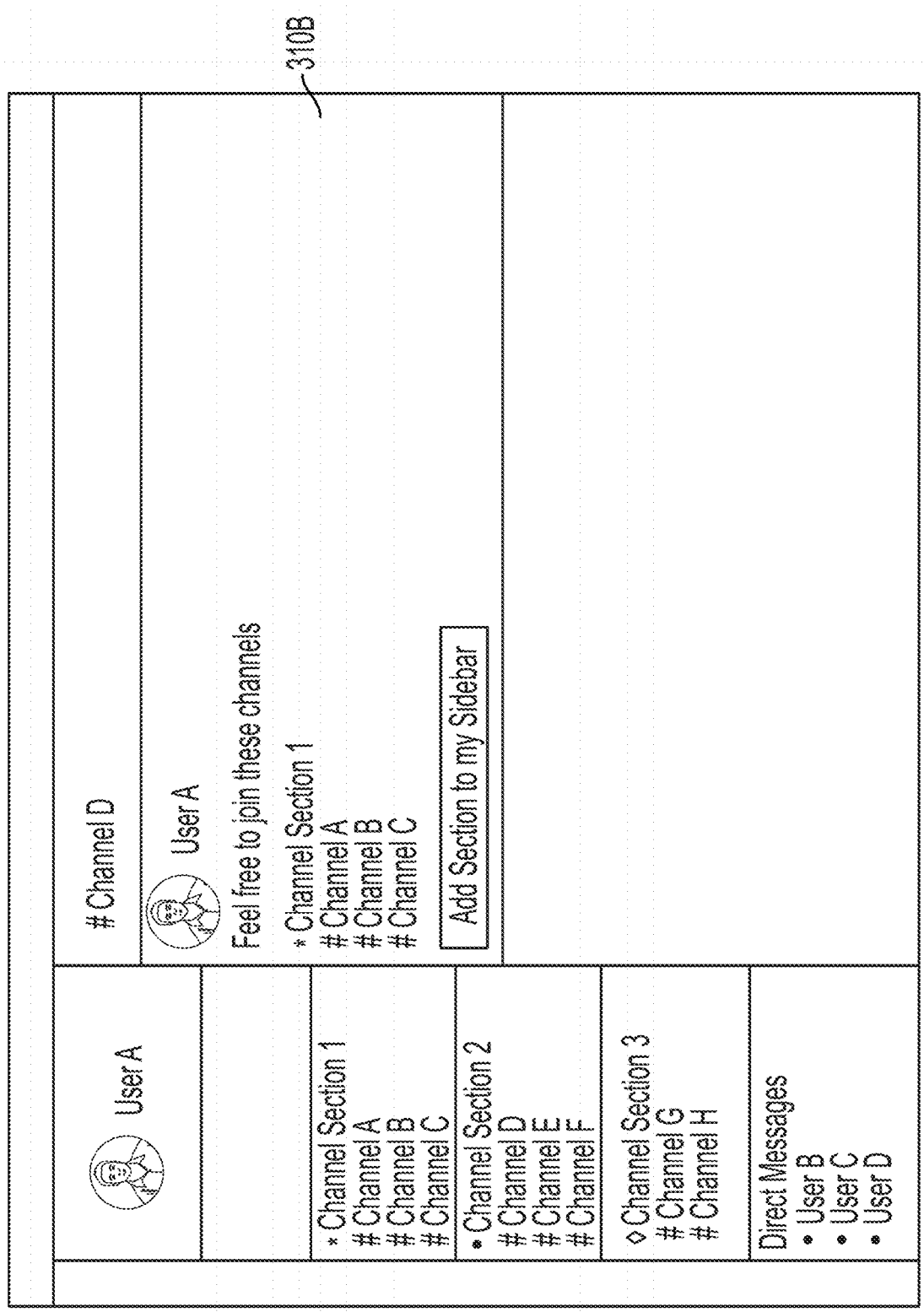

FIGS. 3F-G illustrate aspects of generating and sending a message to share a channel section with all users associated with a channel.

FIG. 3F illustrates an exemplary embodiment of a sharing window 320B, in which User A generates a message to share a channel section by posting the message in a channel. As shown in FIG. 3F, sharing window 320B is similar to sharing window 320A of FIG. 3D in that the sharing window includes a data field for selecting and/or modifying with whom the message (and therefore the channel section) is shared, a data field for adding a comment to the message, an indication of the channel section header and communication channel(s) that will be shared in the message, a user affordance for saving a draft of the message, and a user affordance for sending the message. However, as shown in data field 322 of FIG. 3F, the message may be generated so that it is posted in Channel D. As described above with respect to FIG. 3D, data field 322 may automatically or manually be filled based on whether User A follows the drag-and-drop method or the context-menu method to share a channel section. For example, in contrast to FIG. 3D, User A is now shown to have accessed messages associated with Channel D (the indicator corresponding to Channel D is bolded in sidebar region 148 and reproduced in sub-region 308 of message region 150)

In some embodiments, in response to selection of the user affordance for sending the message generated via sharing window 320B of FIG. 3F, interface 300G of FIG. 3G may be displayed to User A. Interface 300G of FIG. 3G illustrates aspects of display of the generated message (message 310B) in a message feed associated with Channel D. Message 310B is very similar to message 310A of FIG. 3E. However, as shown in FIG. 3G, there are several differences: (1) message 310B includes an indicator that User A (as opposed to another user of Channel D) has sent the message; and (2) message 310B is displayed in a message feed associated with Channel D whereas message 310A is displayed in a message feed associated with only User B. Thus, via interface 300G, User A may view the generated message and confirm that it was posted in Channel D.

Figure 4A:
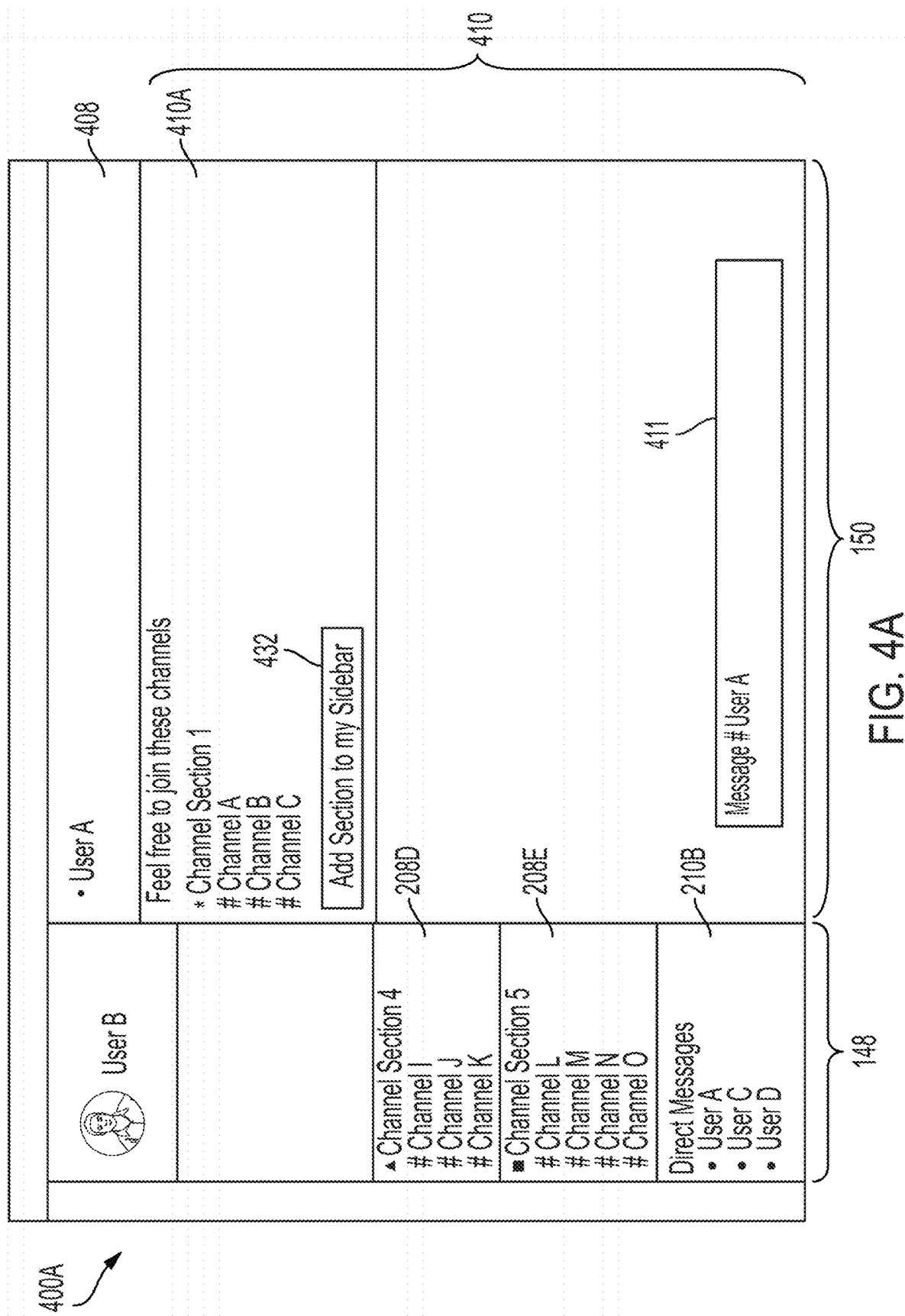

FIGS. 4A-B illustrate aspects of exemplary user interfaces associated with User B of the group-based communication platform, according to various embodiments. Similar to the interface described with respect to FIGS. 3A-G, the interface described with respect to FIGS. 4A-B may include any of the features discussed above with respect to interface 144; for brevity, the discussion of many of the features is not repeated.

In some embodiments, in response to selection of the user affordance for sending the message generated via sharing window 320A of FIG. 3D, interface 400A of FIG. 4A may be displayed to User B. Interface 400A illustrates aspects of an exemplary overview of the user interface associated with User B and illustrates display of the generated message (message 410A) in a message feed associated with User A. As shown in FIG. 4A, similar to the interface described with respect to User A, the interface associated with User B may comprise sidebar region 148 and message region 150.

Sidebar region 148 may further comprise section 208D, in which a channel section header and an indicator for each of Channel I, Channel J, and Channel K of Channel Section 4 are displayed; section 208E, in which a channel section header and an indicator for each of Channel L, Channel M, Channel N, and Channel O of Channel Section 5 are displayed; and section 210B in which a direct message indicator for each of User A, User C, and User D is displayed.

As discussed with respect to FIG. 3A, User B may select an indicator displayed in sidebar region 148 to display messages associated with a message group corresponding to the selected indicator. As shown in FIG. 4A, the indicator corresponding to User A may be reproduced in sub-region 408 of message region 150 and messages associated with User A may be displayed in a message feed within section 410 of message region 150. For example, message 410A, representative of the message sent from User A to User B, is displayed in the message feed. As shown, in some embodiments, message 410A may include the same content (a comment, an indication of the channel section header and the communication channels associated with the channel section shared, and a user affordance (e.g., button 432) to add the channel section to sidebar region 148) shown and described with respect to message 310A of FIG. 3E. As described above with respect to FIG. 3E, the user affordance to add the channel section may not be a selectable button 432. For example, in some alternative embodiments, clicking on the channel section header and/or any indicator corresponding to a channel associated with the channel section may cause a prompt indicating that the channels will be added to the user's sidebar to pop up. In some embodiments, the prompt may ask the user to confirm that he or she wants to proceed with adding the channel section.

In some embodiments, User B may select the user affordance if he or she desires to add the indicated communication channels associated with the shared channel section. Additionally or alternatively, in some embodiments, User B may send a message to User A in response to receipt of message 410A. As shown in FIG. 4A, sub-region 410 includes a message composer window 411, which enables User B to compose a message to send to User A. In some embodiments, in response to selection of the user affordance, interface 400B of FIG. 4B may be displayed.

Interface 400B of FIG. 4B illustrates aspects of an updated version of sidebar region 148 associated with User B. Specifically, FIG. 4B shows that in addition to sections 208D and 208E, the newly added channel section is displayed in section 208A. Thus, User B may quickly and easily add a channel section that has been shared with him or her (e.g., User B may only need to click a button to add the channel section); as a result, User B may be able to quickly and easily access the added communication channels.

According to various embodiments, in some instances, User B may have permission to access each communication channel associated with the added channel section. In these instances, as shown in FIG. 4B, when displayed to User B, Channel Section 1 may include the same content (e.g., the same channel section header and the same indicators representative of communication channels) as shown and described with respect to FIG. 3A. In some instances, User B may have permission to access a communication channel associated with Channel Section 1 even if User B is not a member of the communication channel (e.g., if the communication channel is a public channel).

Moreover, in some embodiments, as shown in FIG. 4B, when displayed to User B, the added channel section may be displayed in the same format as it was displayed in the interface associated with User A. For example, in FIG. 4B, the added channel section is shown to be displayed in association with the same graphical identifier (asterisk 302A) and text string indicative of the channel section name (text string 304 indicating the channel section name is "Channel Section 1"). Displaying the channel section in association with the same graphical identifier and text string may advantageously associate descriptive details with the added channel section, with which User B may not have much familiarity. Moreover, indicators representative of the communication channels associated with the added channel section are shown to be displayed in the same order as shown and described with respect to FIG. 3A; this may advantageously ensure that the communication channels are displayed in an order that follows preferences indicated by User A (who may have ordered a frequently used communication channel and/or a very important communication channel above another communication channel).

However, once added to the interface associated with User B, User B may flexibly customize the sidebar region of their interface. For example, User B may re-order the communication channels associated with the added channel section (e.g., such that after section 208A corresponding to Channel Section 1 is added, Channel C is displayed above Channel A). Similarly, User B may re-order channel sections (e.g., by re-ordering sections 208A, 208D, and 208E, such that section 208A, which includes the added channel section, is displayed above sections 208D and 208E). Moreover, User B may flexibly re-group channels into channel sections by removing channel(s) from and/or adding channel(s) to the added channel section. For example, User B may remove Channel A from and add Channel I to section 208A.

In some embodiments, User B may be able to select not to add one or more channels in a channel sharing message. In some embodiments, where User B is already a member of a channel that User A has tried to share, the channel is not re-added to the interface associated with User B and may simply be left in its original location in the interface associated with User B and the channel section may be added to User B's interface without the channel.

Figure 5A:
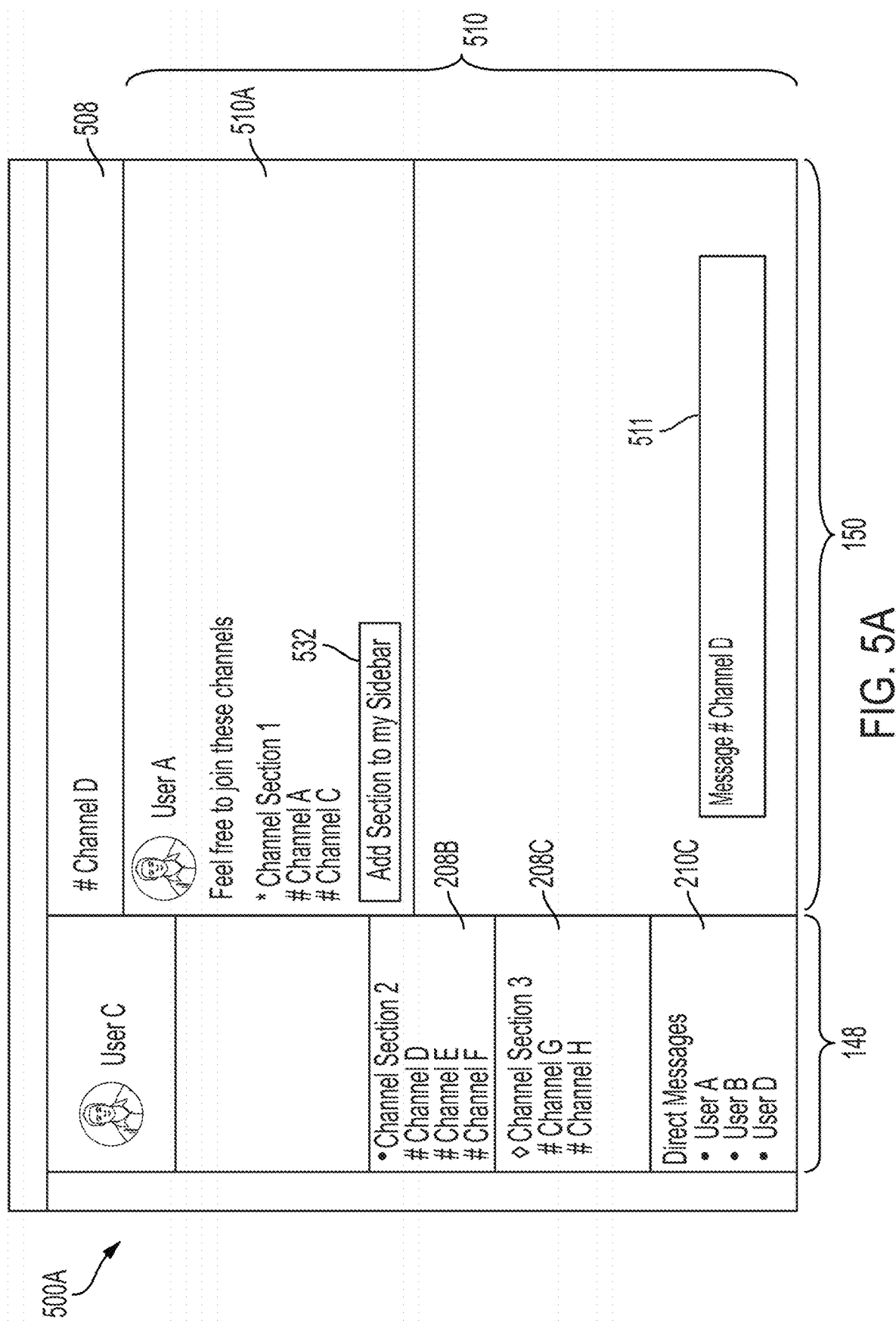

FIGS. 5A-B illustrate aspects of exemplary user interfaces associated with User C of the group-based communication platform, according to various embodiments. User C is a member of Channel D. Similar to the interface described with respect to FIGS. 3A-G, the interface described with respect to FIGS. 5A-B may include any of the features discussed above with respect to interface 144; for brevity, the discussion of many of the features is not repeated.

In some embodiments, in response to selection of the user affordance for sending the message generated via sharing window 320B of FIG. 3F, interface 500A of FIG. 5A may be displayed to User C. Screen 500A illustrates an exemplary overview of the user interface associated with User C and illustrates display of the generated message (message 510A) in a message feed associated with Channel D. As shown in FIG. 5A, similar to the interfaces described with respect to User A and User B, the interface associated with User C may comprise sidebar region 148 and message region 150.

Sidebar region 148 may further comprise section 208B and section 208C, each of which has been described with respect to FIG. 3A; and section 210C in which a direct message indicator for each of User A, User B, and User D is displayed.

As discussed with respect to FIG. 3A and FIG. 4A, User C may select an indicator displayed in sidebar region 148 to display messages associated with a message group corresponding to the selected indicator. As shown in FIG. 5A, the indicator corresponding to Channel D may be reproduced in sub-region 508 of message region 150 and messages associated with Channel D may be displayed in a message feed within sub-region 510 of message region 150. For example, message 510A, representative of the message sent from User A to Channel D, is displayed in the message feed.

In some embodiments, message 510A may include the same content shown and described with respect to message 310B of FIG. 3G. In other embodiments, message 510A may not include the same content shown and described with respect to message 310B of FIG. 3G. Due to permission settings, user inputs, and/or the channels User C is already a member of, User C may not add all channels associated with the shared channel section. For example, as shown in FIG. 5A, message 510A does not include an indicator for Channel B.

In some embodiments, Channel B may be a private channel that User C does not have permission to access. In some embodiments, User C may not be able to tell that User A attempted to share Channel B; as shown in FIG. 5A, instead of including an indicator for each of Channel A, Channel B, and Channel C, message 510A may only include an indicator for each of Channel A and Channel C. Thus, User C may only see indicators for communication channels User C has permission to access; indicators for communication channels User B does not have permission to access may be hidden. In other embodiments, User C may be able to tell that User A attempted to share Channel B. For example, a portion of the interface that would have otherwise displayed the indicator for Channel B may be modified so that it is greyed out.

In some embodiments, User C may provide an input to add only a subset of a set of communication channels associated with a channel section. Adding only a subset of a set of communication channels associated with a channel section may advantageously provide increased flexibility when adding communication channels, and may ensure that no channels are added unnecessarily. In these embodiments, even if User A requests to share all communication channels associated with Channel Section 1, User C may provide an input to add only Channel A and Channel C of Channel Section 1. In some embodiments, a user affordance (e.g., a checkbox) may be displayed in association with each indicator, such that the user affordance associated with each indicator may be selected or unselected before selecting a user affordance to add a shared channel section (e.g., button 532).

In some embodiments, User C may already be a member of a channel that User A has tried to share. As discussed above with respect to User B, if User C is already a member of the channel, the channel may not be re-added to the interface associated with User C even if User C tries add the channel. For example, if User C is already a member of Channel B, even if User C requests to add all communication channels associated with Channel Section 1, only Channel A and Channel C of Channel Section 1 may be added to the interface associated with User C. Forgoing re-adding a channel is particularly useful when sharing a channel section with a channel, in which each member may be a member of different channels and may have different sidebar arrangements.

In some embodiments, User C may select the user affordance to add the shared channel section if he or she desires to add the indicated communication channels associated with the shared channel section. Additionally or alternatively, in some embodiments, User C may send a message to Channel D in response to receipt of message 510A. As shown in FIG. 5A, sub-region 510 includes a message composer window 511, which enables User C to compose a message to send to Channel D. In some embodiments, in response to selection of the user affordance, screen 500B of FIG. 5B may be displayed.

Screen 500B of FIG. 5B illustrates an updated version of region 148 associated with User C. Specifically, FIG. 5B shows that in addition to sections 208B and 208C, the newly added channel section is displayed in section 208A. Thus, User C may quickly and easily add a channel section that has been shared with him or her (e.g., User C may only need to click a button to add the channel section); as a result, User C may be able to quickly and easily access the added communication channels.

As shown in FIG. 5B, in some embodiments, upon selecting the user affordance to add the shared channel section to the sidebar region, User C may add a version of Channel Section 1 that omits an indicator for Channel B. Alternatively, in some embodiments, before User B selects the user affordance to add the channel section to the sidebar region, a message may be displayed to User C to alert User C that at least one communication channel is hidden from him or her. Further, the message may provide a user affordance which User C may select to request permission to access the at least one hidden communication channel (e.g., Channel B). If User C is granted permission to access Channel C (e.g., if User A or an administrator associated with Channel B grants User C permission to access Channel B), then (1) message 510A may be updated to include an indicator for Channel B; and/or (2) when User C selects the user affordance to add the channel section to the sidebar region, User C may add a version of Channel Section 1 that includes an indicator for Channel B.

FIGS. 5A-B have been described with respect to one particular user of a communication channel with which a channel section has been shared. However, it is to be understood that each user associated with the communication channel with which channel section has been shared may be able to add the shared channel section to a respective interface associated with the user. Moreover, it is to be understood that each user may be associated with specific permission settings, may provide an input to add particular channels, and/or may already be a member of a particular set of channels. Which communication channels the user can add may depend upon the permission settings, the input, and/or the membership(s) associated with the user.

While FIGS. 3A-5B have been described with respect to sharing a particular channel section (Channel Section 1) between particular users (User A, User B, and User C) of the group-based communication platform, it is to be understood that FIGS. 3A-5B are representative of exemplary embodiments and are described in this manner for simplicity. However, alternative embodiments are possible. Several examples of alternative embodiments are listed below.

In some alternative embodiments, as opposed to sharing Channel Section 1, User A may share any channel section (e.g., Channel Section 2 or Channel Section 3). Similarly, in some alternative embodiments, any user of the group-based communication platform may share a communication channel section with any other user(s) of the group-based communication platform. For example, User B may share Channel Section 4 or Channel Section 5 with User A.

In some embodiments, as opposed to sharing a channel section, an individual channel can be shared between users of the group-based communication platform. For example, User A may select any of Channels A-H to share a selected channel with User B. Similarly, a set of channels can be shared between users of the group-based communication platform even if they are not associated with the same channel section. For example, User A may share a set of channels including Channel A, Channel D, and Channel H with User B.

Figure 6:
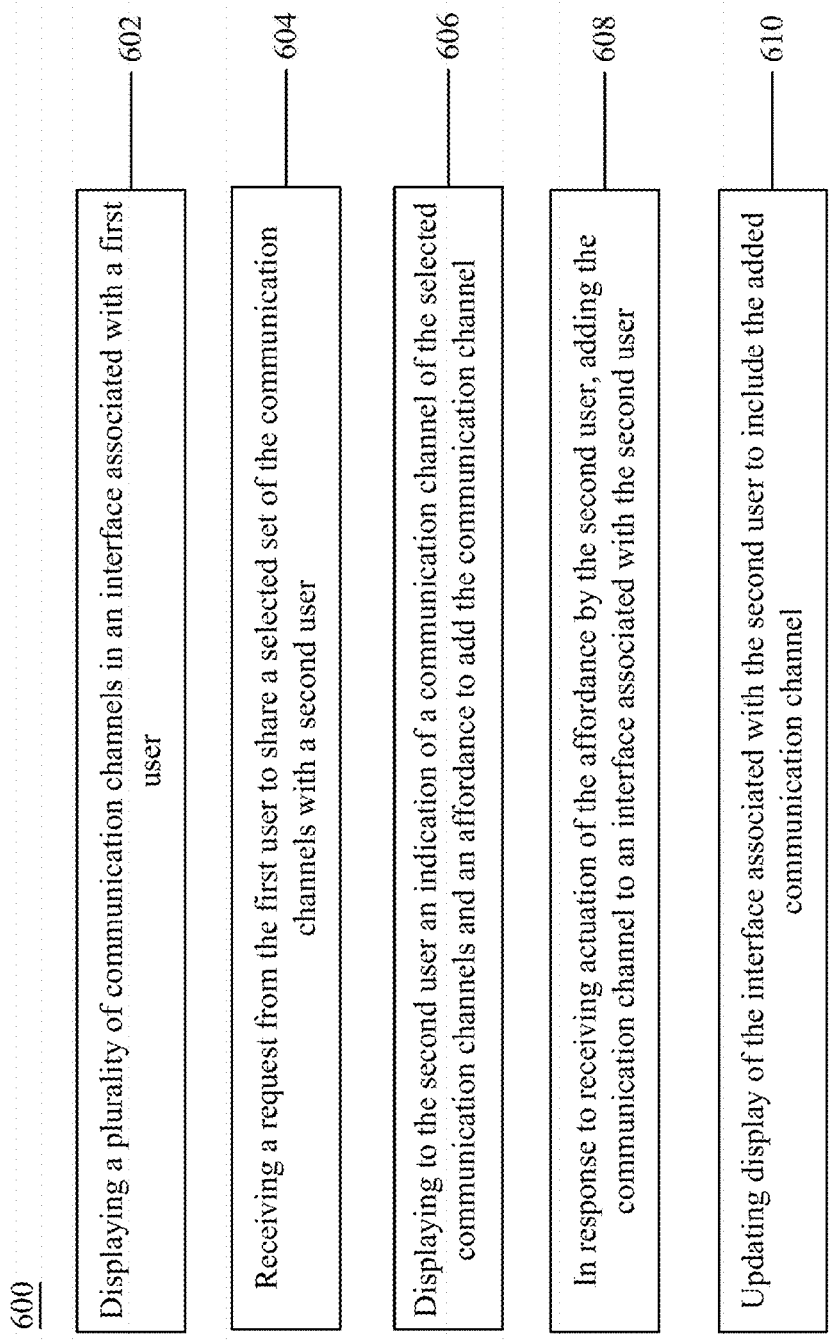
FIG. 6 illustrates a method for sharing a section of communication channels within a group-based communication platform, according to some embodiments.

FIG. 6 illustrates a method 600 for sharing a section of communication channels within a group-based communication platform, according to some embodiments. In some embodiments, method 600 is performed at least partially on a user computing device, such as user computing device 104 of FIG. 1. In some embodiments, method 600 is performed by user computing device 104 in communication with one or more servers 102 of FIG. 1.

At step 602, a plurality of communication channels are displayed in a group-based communication interface associated with a first user of the group-based communication platform. For example, with reference to FIG. 3A, Channels A-H are displayed in an interface associated with User A. In some embodiments, one, some, or all of the communication channels are organized into one or more channel sections. For example, with reference to FIG. 3A, Channels A-C are organized into Channel Section 1, Channels D-F are organized into Channel Section 2, and Channels G-H are organized into Channel Section 3.

At step 604, the first user requests to share a selected set of the communication channels with at least a second user of the group-based communication platform. For example, with reference to FIGS. 3A-C, User A may request to share a channel section (e.g., Channel Section 1) with User B. The first user may request to share the selected set of communication channels via a "drag-and-drop" method in which the selected set of communication channels is dragged from a sidebar region to a message feed between the first user and at least the second user, or the first user may request to share the selected set of communication channels via a "context-menu" method in which the first user selects to share the set of communication channels and then selects to share the selected set of communication channels with at least the second user.

At step 606, an indication of at least one communication channel of the selected communication channels and an affordance to add the at least one communication channel of the selected set of communication channels is displayed to at least the second user. For example, with reference to FIG. 4A, a message including an indication for each of Channels A-C and button 432 may be displayed to User B. In some embodiments, based on permission settings associated with the second user, permission settings associated with the communication channels shared, and/or input from the second user (e.g., input to add one channel but not to add another), not all communication channels that the first user requested to be shared with the second user may be shared with the second user (e.g., some communication channels may not be visible to the second user).

At step 608, in response to actuation of the affordance by the second user, the at least one communication channel is added to a group-based communication platform interface associated with the second user.

At step 610, display of the interface associated with the second user is updated to include the at least one added communication channel. For example, with reference to FIG. 4B, Channels A-C included in Channel Section 1 may be added to the interface associated with User B. Moreover, in those embodiments in which the second user has added a channel section, the channel section header associated with the added channel section may be the same as that displayed to the first user and indicators representative of communication channels associated with the added channel section may be displayed in the same order in which they were displayed to the first user. However, once the channel section has been added to the interface associated with the second user, the second user may modify display of the added channel section based on their preferences.

Unless defined otherwise, all terms of art, notations and other technical and scientific terms or terminology used herein are intended to have the same meaning as is commonly understood by one of ordinary skill in the art to which the claimed subject matter pertains. In some cases, terms with commonly understood meanings are defined herein for clarity and/or for ready reference, and the inclusion of such definitions herein should not necessarily be construed to represent a substantial difference over what is generally understood in the art.

This application discloses several numerical ranges in the text and figures. The numerical ranges disclosed inherently support any range or value within the disclosed numerical ranges, including the endpoints, even though a precise range limitation is not stated verbatim in the specification because this disclosure can be practiced throughout the disclosed numerical ranges.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims. Finally, the entire disclosure of the patents and publications referred to in this application are hereby incorporated herein by reference.

The invention claimed is:

1. A method for sharing group-based communication channels, comprising:
   receiving, via a first user interface of a first user device, a first user input grouping a plurality of group-based communication channels into a section, the first user device associated with a first user of a group-based communication platform;
   sending, to the first user device, a first interface of the group-based communication platform comprising the section for display via a sidebar of the first interface;
   receiving, via the first user interface of the first user device, a second user input posting a message within the group-based communication platform, the message comprising an indication to share the section with at least a second user of the group-based communication platform;
   in response to posting the message, sending, for display via a second user interface of a second user device associated with the second user, a second interface of the group-based communication platform comprising the message, the message comprising one or more indications of one or more group-based communication channels of the plurality of group-based communication channels grouped into the section based at least in part on the message comprising the indication to share the section with at least the second user;
   receiving, via the second user interface of the second user device, a third user input selecting, from the message, at least one channel of the one or more group-based communication channels; and
   in response to the third user input, adding the second user as a member of the selected at least one channel.

2. The method of claim 1, further comprising:
   determining the one or more group-based communication channels to share with the second user from the plurality of group-based communication channels based at least in part on channel types for the plurality of group-based communication channels, permissions for the plurality of group-based communication channels, privacy settings for the plurality of group-based communication channels, the second user, or any combination thereof, wherein the second interface is based at least in part on the determining.

3. The method of claim 1, wherein the first interface of the group-based communication platform further comprises a menu of options associated with the section, the menu of options for display via the sidebar of the first interface, the method further comprising:
   receiving, via the first user interface of the first user device, a fourth user input selecting a share option from the menu of options associated with the section; and
   in response to the fourth user input, sending, to the first user device, a third interface of the group-based communication platform comprising a sharing window for generating the message, wherein the second user input posting the message is input via the sharing window.

4. The method of claim 3, wherein the sharing window comprises an indication of the plurality of group-based communication channels grouped into the section for display via the first user interface based at least in part on the fourth user input.

5. The method of claim 1, further comprising:
   receiving, via the first user interface of the first user device, a fourth user input dragging the section from the sidebar of the first interface into a message region of the first interface, wherein the message comprises the indication to share the section based at least in part on the fourth user input dragging the section into the message region.

6. The method of claim 5, wherein the message region comprises an indication of the plurality of group-based communication channels grouped into the section for display via the first user interface based at least in part on the fourth user input.

7. The method of claim 1, further comprising:
   receiving, via the first user interface of the first user device, a fourth user input indicating a section name for the section, wherein the second interface of the group-based communication platform further comprises an indication of the section name for the section.

8. The method of claim 7, wherein the section name comprises a text string input via an input field associated with sharing the section.

9. The method of claim 1, further comprising:
receiving, via the first user interface of the first user device, a fourth user input indicating to share the section with one or more users comprising at least the second user; and
in response to the fourth user input, determining the indication to share the section with the one or more users comprising at least the second user.

10. The method of claim 1, further comprising:
receiving, via the first user interface of the first user device, a fourth user input adding text for the message, wherein the second interface of the group-based communication platform further comprises the text for the message comprising the indication to share the section with at least the second user.

11. The method of claim 1, wherein the second interface of the group-based communication platform further comprises one or more checkboxes associated with the one or more group-based communication channels of the plurality of group-based communication channels grouped into the section, wherein a checkbox of the one or more checkboxes is associated with a respective group-based communication channel of the one or more group-based communication channels.

12. The method of claim 11, further comprising:
receiving, via the second user interface of the second user device, at least a fourth user input selecting a subset of the one or more checkboxes associated with a subset of the one or more group-based communication channels; and
in response to at least the fourth user input, creating a second section for the second user, the second section comprising the subset of the one or more group-based communication channels based at least in part on the selected subset of the one or more checkboxes.

13. The method of claim 11, further comprising:
receiving, via the second user interface of the second user device, a fourth user input selecting all of the one or more group-based communication channels; and
in response to the fourth user input, creating a second section for the second user, the second section comprising the one or more group-based communication channels based at least in part on the fourth user input selecting all of the one or more group-based communication channels.

14. The method of claim 1, further comprising:
in response to the second user input, sending, for display via the first user interface of the first user device, a confirmation message indicating the section to be shared, with which one or more users comprising at least the second user the section is to be shared, or both.

15. The method of claim 1, wherein a group-based communication channel of the plurality of group-based communication channels is a data route for exchanging data between a plurality of devices associated with the group-based communication platform.

16. An apparatus for sharing group-based communication channels, comprising:
a processor;
memory coupled with the processor; and
instructions stored in the memory and executable by the processor to cause the apparatus to:
receive, via a first user interface of a first user device, a first user input grouping a plurality of group-based communication channels into a section, the first user device associated with a first user of a group-based communication platform;
send, to the first user device, a first interface of the group-based communication platform comprising the section for display via a sidebar of the first interface;
receive, via the first user interface of the first user device, a second user input posting a message within the group-based communication platform, the message comprising an indication to share the section with at least a second user of the group-based communication platform;
in response to posting the message, send, for display via a second user interface of a second user device associated with the second user, a second interface of the group-based communication platform comprising the message, the message comprising one or more indications of one or more group-based communication channels of the plurality of group-based communication channels grouped into the section based at least in part on the message comprising the indication to share the section with at least the second user;
receive, via the second user interface of the second user device, a third user input selecting, from the message, at least one channel of the one or more group-based communication channels; and
in response to the third user input, add the second user as a member of the selected at least one channel.

17. The apparatus of claim 16, wherein the instructions are further executable by the processor to cause the apparatus to:
determine the one or more group-based communication channels to share with the second user from the plurality of group-based communication channels based at least in part on channel types for the plurality of group-based communication channels, permissions for the plurality of group-based communication channels, privacy settings for the plurality of group-based communication channels, the second user, or any combination thereof, wherein the second interface is based at least in part on the determining.

18. The apparatus of claim 16, wherein the first interface of the group-based communication platform further comprises a menu of options associated with the section, the menu of options for display via the sidebar of the first interface, the instructions further executable by the processor to cause the apparatus to:
receive, via the first user interface of the first user device, a fourth user input selecting a share option from the menu of options associated with the section; and
in response to the fourth user input, send, to the first user device, a third interface of the group-based communication platform comprising a sharing window for generating the message, wherein the second user input posting the message is input via the sharing window.

19. The apparatus of claim 16, wherein the instructions are further executable by the processor to cause the apparatus to:
receive, via the first user interface of the first user device, a fourth user input dragging the section from the sidebar of the first interface into a message region of the first interface, wherein the message comprises the indication to share the section based at least in part on the fourth user input dragging the section into the message region.

20. A non-transitory computer-readable medium storing code for sharing group-based communication channels, the code comprising instructions executable by a processor to:
- receive, via a first user interface of a first user device, a first user input grouping a plurality of group-based communication channels into a section, the first user device associated with a first user of a group-based communication platform;
- send, to the first user device, a first interface of the group-based communication platform comprising the section for display via a sidebar of the first interface;
- receive, via the first user interface of the first user device, a second user input posting a message within the group-based communication platform, the message comprising an indication to share the section with at least a second user of the group-based communication platform;
- in response to posting the message, send, for display via a second user interface of a second user device associated with the second user, a second interface of the group-based communication platform comprising the message, the message comprising one or more indications of one or more group-based communication channels of the plurality of group-based communication channels grouped into the section based at least in part on the message comprising the indication to share the section with at least the second user;
- receive, via the second user interface of the second user device, a third user input selecting, from the message, at least one channel of the one or more group-based communication channels; and
- in response to the third user input, add the second user as a member of the selected at least one channel.

* * * * *